United States Patent [19]
Blatchley, III et al.

[11] Patent Number: 5,952,663
[45] Date of Patent: Sep. 14, 1999

[54] APPARATUS FOR IMPROVING UV DOSAGE APPLIED TO FLUIDS IN OPEN CHANNEL UV DISINFECTION SYSTEMS

[75] Inventors: Ernest Rowland Blatchley, III; Kuang-Ping Chiu, both of West Lafayette, Ind.; E. Ronald Magee, Midlothian; James M. Kallio, Montpelier, both of Va.; Zdravka Do-Quang, Le Pecq, France; Dennis Anthony Lyn, West Lafayette, Ind.

[73] Assignee: Infilco Degremont, Inc., Richmond, Va.

[21] Appl. No.: 08/898,307

[22] Filed: Jul. 22, 1997

[51] Int. Cl.[6] .................................................. G01N 21/33
[52] U.S. Cl. ........................................... 250/435; 250/437
[58] Field of Search ................................. 250/432 R, 435, 250/436, 437, 438; 422/24

[56] References Cited

U.S. PATENT DOCUMENTS

| | | |
|---|---|---|
| 3,182,193 | 5/1965 | Ellner et al. . |
| 4,103,167 | 7/1978 | Ellner . |
| 4,267,455 | 5/1981 | Keller . |
| 4,767,932 | 8/1988 | Ellner ...................................... 250/436 |
| 4,849,115 | 7/1989 | Cole et al. . |
| 4,897,246 | 1/1990 | Peterson . |
| 4,899,056 | 2/1990 | Ellner ...................................... 250/436 |
| 4,952,376 | 8/1990 | Peterson .................................. 250/438 |
| 5,019,256 | 5/1991 | Ifill et al. ................................. 250/436 |
| 5,112,370 | 5/1992 | Gazzano .................................... 55/102 |
| 5,124,131 | 6/1992 | Wekhof .................................... 250/436 |
| 5,308,505 | 5/1994 | Titus et al. . |
| 5,332,388 | 7/1994 | Schuerch et al. . |
| 5,352,359 | 10/1994 | Nagai et al. . |
| 5,660,719 | 8/1997 | Kurtz ...................................... 250/436 |
| 5,675,153 | 10/1997 | Snowball ................................ 250/438 |
| 5,696,380 | 12/1997 | Cooke et al. ............................ 250/436 |

FOREIGN PATENT DOCUMENTS

| | | |
|---|---|---|
| 9047 | of 1911 | United Kingdom . |
| 1 385 661 | 2/1975 | United Kingdom . |

OTHER PUBLICATIONS

Bioassay for Full–Scale UV Disinfection Systems, Ernest R. Blatchley, III and Bruce A. Hunt, *Wat. Sci. Tech.*, vol. 30, No. 4, pp. 115–123, 1994.

*Primary Examiner*—Bruce C. Anderson
*Attorney, Agent, or Firm*—Schnader Harrison Segal & Lewis

[57] ABSTRACT

The invention provides an immersible and portable module for irradiating fluids including a multiplicity of ultraviolet radiation producing lamp and a first header for receiving and maintaining in position the multiplicity of ultraviolet radiation-producing lamps, the first header having upstream and downstream ends and opposed sides. There is also a second header for receiving and maintaining in position the multiplicity of ultraviolet radiation-producing lamps, the second header having upstream and downstream ends and opposed sides. Fluid flow diverters are positioned between the first and second headers and located adjacent the opposed sides and are adapted to divert fluids flowing adjacent the opposed sides toward at least some of the ultraviolet radiation-producing lamps.

27 Claims, 21 Drawing Sheets

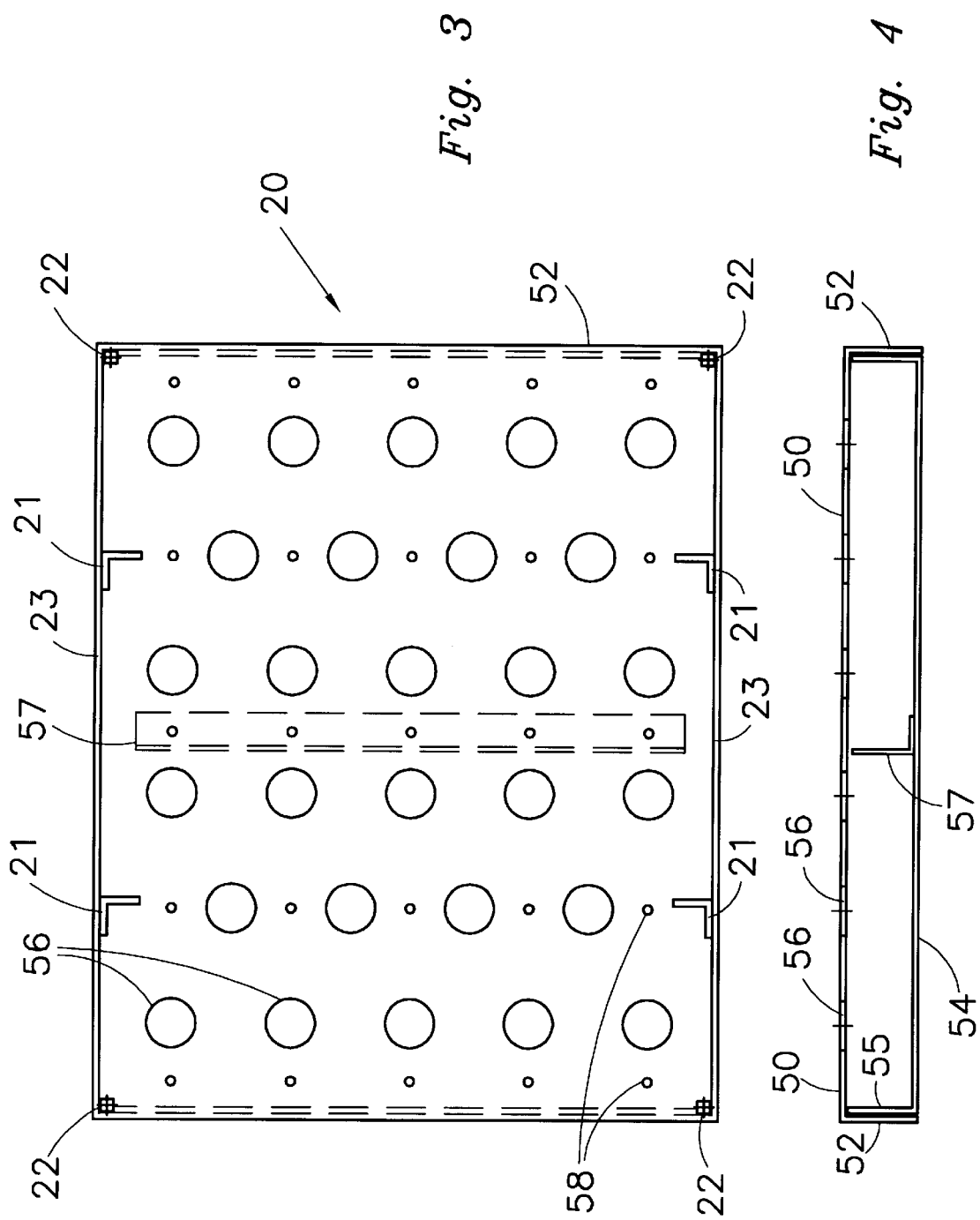

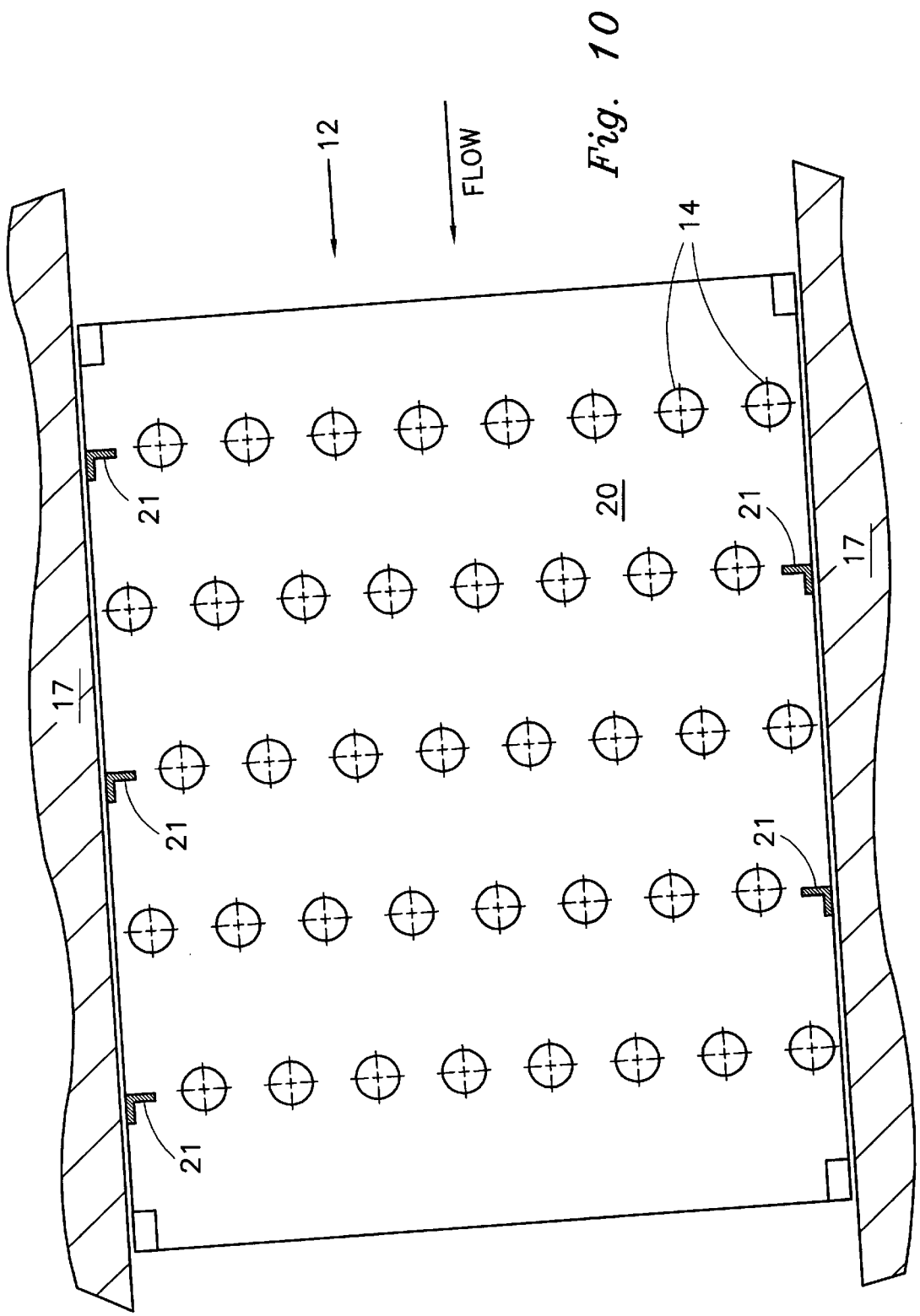

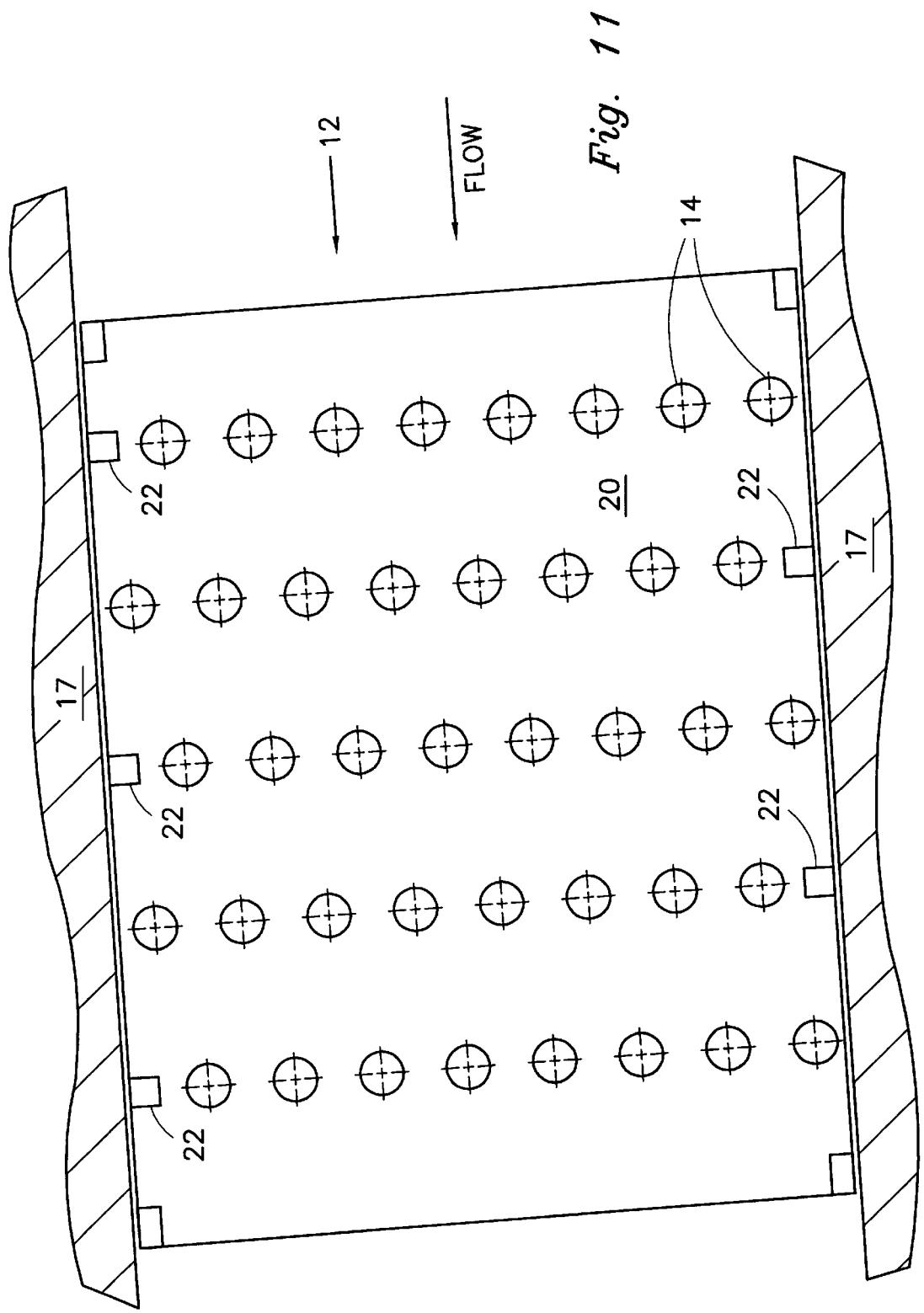

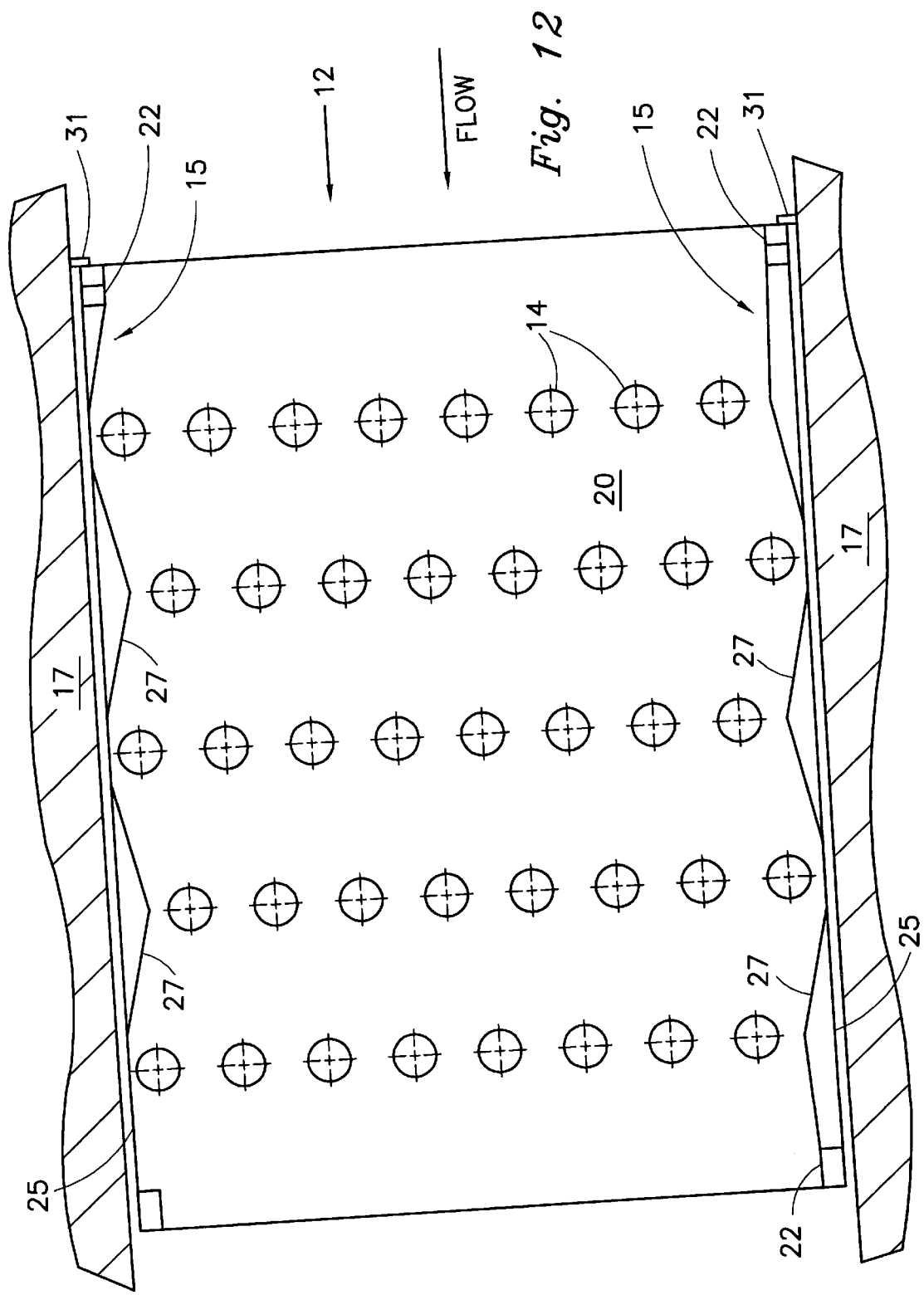

APPARATUS FOR IMPROVING UV DOSAGE APPLIED TO FLUIDS IN OPEN CHANNEL UV DISINFECTION SYSTEMS

FIELD OF THE INVENTION

This invention relates to disinfection of fluids with ultraviolet radiation, particularly to an immersible, portable disinfection module capable of efficiently irradiating such fluids.

BACKGROUND OF THE INVENTION

Disinfection, as applied in water and wastewater treatment, is a process by which pathogenic microorganisms are inactivated to provide public health protection. Chlorination has been the dominant method employed for disinfection for almost 100 years. However, it is no longer the disinfection method automatically chosen for either water or wastewater treatment because of the potential problems associated with disinfection by-products and associated toxicity in treated water. UV irradiation is the most frequently chosen alternative to conventional chlorination. Since UV radiation is a nonchemical agent, it does not yield any disinfectant residual. Therefore, the concerns associated with toxic disinfectant residuals do not apply. In addition, UV disinfection is a rapid process. Little contact time (on the order of seconds rather than minutes) is required. The result is that UV equipment occupies little space when compared to chlorination and ozonation.

The vast majority of UV disinfection systems employ an open-channel configuration. Two types of open-channel UV disinfection systems exist: horizontal systems, in which ultraviolet radiation-producing lamps, hereinafter referred to as "lamps," are arranged parallel to the direction of flow; and vertical systems, in which lamps are perpendicular to the water surface. For most vertical UV systems, the lamps are arranged in a staggered pattern to promote mixing.

The responses of microorganisms to UV irradiation are entirely attributable to the dose of radiation to which they are exposed. The UV dose is defined as the product of radiation intensity and exposure time. As a result of turbulent flow conditions and three-dimensional spatial variations in UV intensity, continuous-flow UV systems deliver a broad distribution of UV doses. The elementary principles of reactor theory can be used to demonstrate that this distribution of doses leads to inefficient use of the UV energy emitted within these systems. Furthermore, the theoretical upper limit on UV reactor performance coincides with a system which accomplishes the delivery of a single UV dose (i.e., a dose distribution which can be represented by a delta function). Optimal dose distribution is not possible in currently used UV disinfection systems.

An average dose does not accurately describe the disinfection efficiency of a full-scale UV system. The UV intensity is a function of position. The intensity of the UV radiation decreases rapidly with distance from the source of radiation. The exposure time is not a constant either. The complex geometry of open-channel UV systems dictates complex hydrodynamic behavior as well, with strong velocity gradients being observed. Coincidentally, the velocity is generally highest in areas of lowest intensity. This creates a situation in which some microorganisms are exposed to a low UV intensity over a comparatively short period of time, thereby allowing them to "escape" the system with a relatively low UV dose. This represents a potentially serious process limitation in open-channel UV systems. For example, if 1% of the microorganisms received doses lower than the lethal level, then the maximum inactivation which could be achieved by the system would be 99%, no matter what actual average dose was delivered.

Due to the lack of information regarding hydrodynamic behavior in UV systems, there has been no acceptable approach by which disinfection efficiency of any open-channel UV reactor can be accurately predicted. Therefore, design decisions have been based on empirical observations and past experience. Furthermore, the non-uniform distribution of UV doses in these systems indicates that UV radiation is applied inefficiently. While UV overdose apparently presents no danger in terms of finished water composition, it does increase operating and capital costs. Therefore, it is desired to have a system which incorporates the effects of hydrodynamic behavior and the UV intensity field to provide for complete disinfection.

OBJECTS OF THE INVENTION

It is an object of the invention to provide UV disinfection apparatus capable of applying a desired UV dose distribution to fluid flowing through a UV disinfection system.

It is another object of the invention to provide UV disinfection apparatus with greater efficiency, thereby reducing operational costs.

It is an important object of the invention to provide a portable disinfection apparatus which contains in one structure the ability to achieve the above objects.

Other objects and advantages of the invention will become apparent to those skilled in the art from the drawings, the detailed description of the invention and the appended claims.

SUMMARY OF THE INVENTION

The invention provides an immersible and portable module for irradiating fluids including a multiplicity of ultraviolet radiation producing lamps and a first header for receiving and maintaining in position the multiplicity of ultraviolet radiation-producing lamps, the first header having upstream and downstream ends and opposed sides. There is also a second header for receiving and maintaining in position the multiplicity of ultraviolet radiation-producing lamps, the second header having upstream and downstream ends and opposed sides. Fluid flow diverters are positioned between the first and second headers and located adjacent the opposed sides and are adapted to divert fluids flowing adjacent the opposed sides toward at least some of the ultraviolet radiation-producing lamps.

BRIEF DESCRIPTION OF THE DRAWINGS

FIG. 3 shows a top plan view of a bottom header, prior to installation of lamps and jackets, in accordance with aspects of the invention.

FIG. 4 shows a front elevational cross section of the bottom header shown in FIG. 3.

FIG. 10 shows a top plan view of a fluid treatment channel containing a module, taken in section, showing aspects of the invention.

FIG. 11 shows a top plan view of a fluid treatment channel containing a module, taken in section, showing a different embodiment of the invention.

FIG. 12 shows a top plan view of a fluid treatment channel containing a module, taken in section, showing aspects of the invention from FIG. 9B.

DETAILED DESCRIPTION OF THE INVENTION

Figure 1:
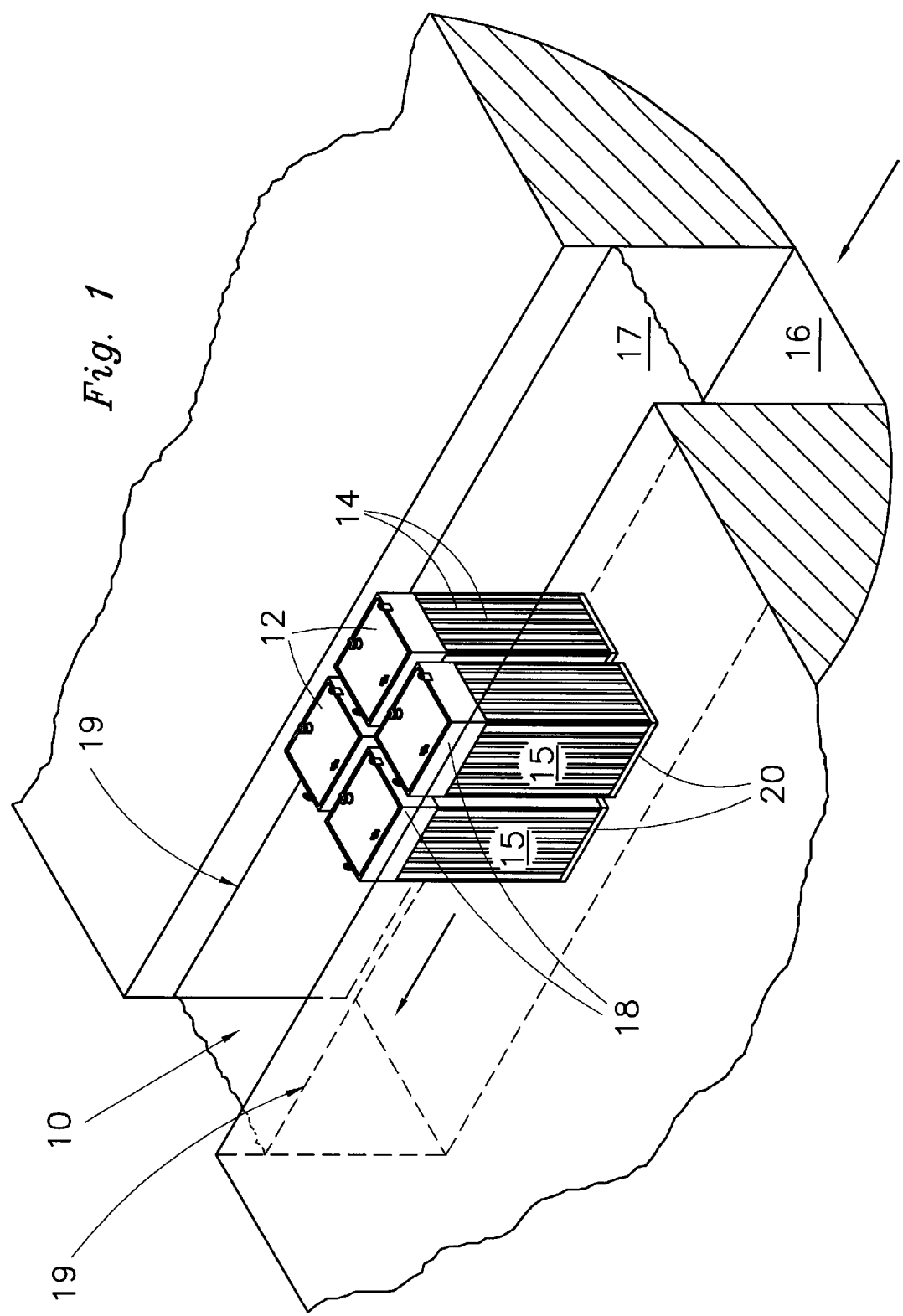
FIG. 1 shows a schematic perspective view of portable and immersible modules of the invention located in a portion of an open channel in accordance with preferred aspects of the invention.

It will be appreciated that the following description is intended to refer to the specific embodiments of the invention selected for illustration in the drawings and is not intended to define or limit the invention other than in the appended claims.

As described above, process effectiveness in UV disinfection systems is governed by the UV radiation dose distribution. The dose distribution is determined by (turbulent) hydrodynamic behavior and the (non-uniform) UV intensity field. In turn, these characteristics are determined by the geometry of the system and the imposed hydraulic loading.

System geometry plays an important role in both the hydrodynamics and intensity fields of these systems. The systems of the invention incorporate open-channel hydraulics. Therefore, flow in these systems is governed by gravitation and viscous forces alone. As described above, two fundamentally different open-channel UV systems exist: systems with lamps oriented horizontal and parallel to the direction of flow ("horizontal systems") and systems with vertically oriented lamps positioned perpendicular to the direction of flow ("vertical systems"). Though the orientation of lamps relative to fluid flow results in fundamental differences in both hydrodynamics and the radiation intensity field, we have found that similar principles are applied in both systems to achieve improvements in process performance.

In vertical systems, we measured and observed relatively aggressive mixing on the downstream side of all lamps. Within the bulk of the vertical array, this mixing achieves an effective distribution of radiation doses for particles which enter the system. However, along the channel walls of a vertical system, we have discovered that there exists relatively large areas of low radiation intensity, high velocity and minimal transverse mixing. As in the case of the horizontal systems, this combination of characteristics leads to less than optimal performance. In the case of vertical UV systems used for disinfection, the vast majority of microorganisms which retain viability following irradiation are believed to enter the irradiated zone on streamlines which are coincident with the areas near the channel walls.

We discovered that process performance in a vertical UV system is greatly improved by modifying the fluid dynamics near the walls to accomplish a more uniform radiation dose distribution. This has been accomplished as follows:

1. Fluid diverters are placed along the walls to promote transverse mixing in these areas. The placement of the fluid diverters is such that particles have a severely diminished likelihood of traversing the system on a streamline which allows a low dose. Specific structures are described below.

2. Near-wall areas of low intensity are filled in with alternate fluid diverters to prevent flow into the regions of low intensity and high velocity. The shape of these "diverters" is determined by location of the radiation intensity field. The diverters also accomplish some level of transverse mixing in the near-wall areas. Specific structures are described below.

Turning now to the drawings in general and FIG. 1 in particular, the number 10 designates an open channel through which waste water flows for disinfection treatment. One or more immersible and portable disinfection modules 12 are located in channel 10 to irradiate waste water with ultraviolet radiation and thereby disinfect it as it flows through channel 10. Each module includes a multiplicity of lamps 14 in highly transmissive jackets 24 (see also FIG. 2) located between upper header 18 and lower header 20 which in the embodiment shown are vertically oriented in prearranged patterns. The modules rest on the floor 16 of channel 10 and are positioned adjacent walls 17.

Fluid diverters 15 are positioned on modules 12 between upper header 18 and lower header 20 and are located along side walls 17.

Channel 10 is sized so that waste water passes lamps 14 in transparent jackets 24 and is maintained at a predetermined depth which preferably remains at or below water elevation 19, which is below upper header 18. The quantity, flow rate, type and composition of the waste water is affected by other systems and apparatus known in the art and not discussed herein.

Figure 2:
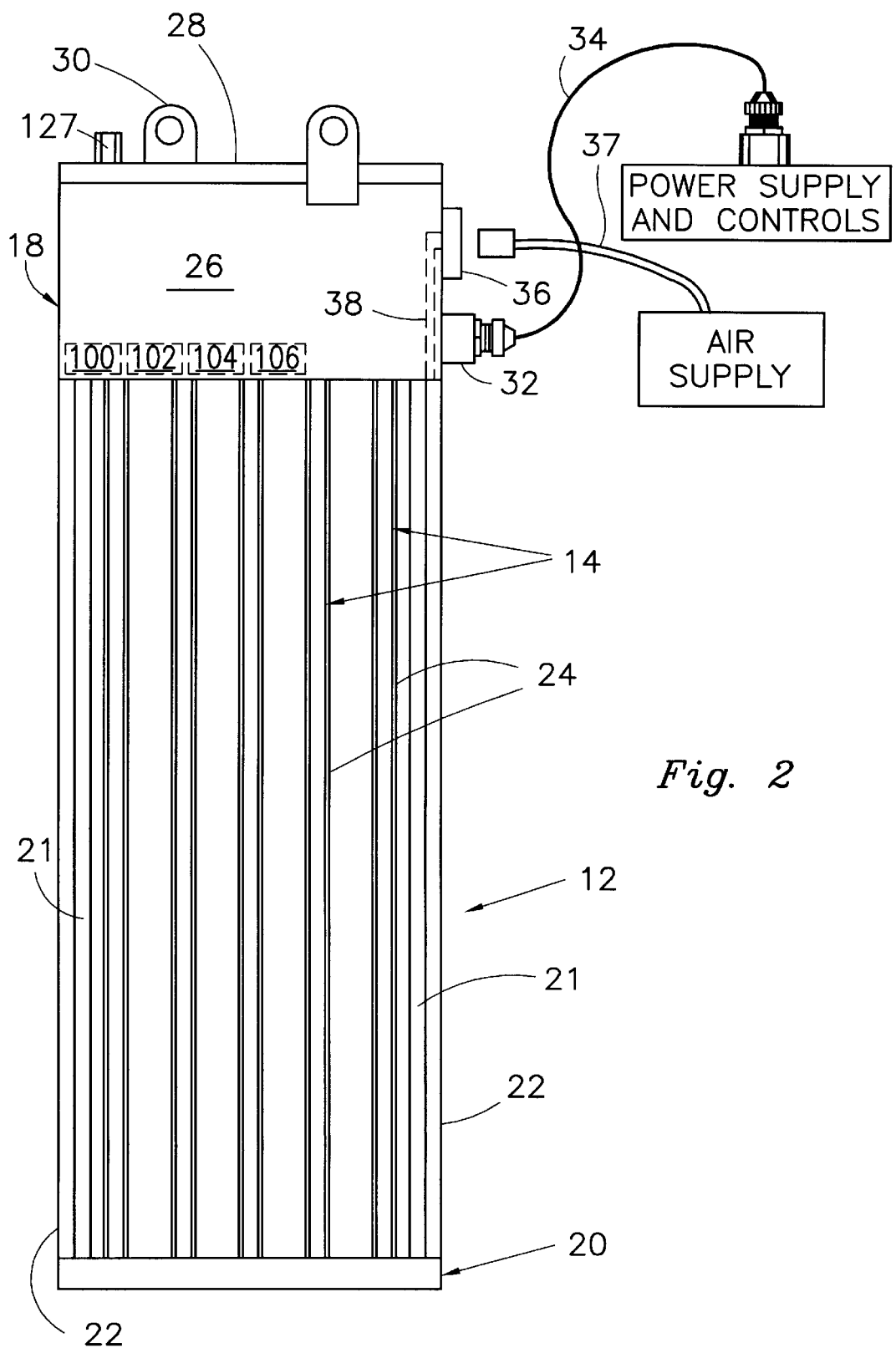
FIG. 2 shows a front elevational view of a module in accordance with the invention.

FIGS. 2–4 show one embodiment of a module 12 in accordance with the invention. The integral structure of module 12 includes an upper header 18 and a lower header 20. Legs 22 connect upper and lower headers 18 and 20 and are preferably spaced apart at the respective corners of module 12. A multiplicity of transparent jackets 24 are connected between upper and lower headers 18 and 22 and each jacket 24 contains one or more lamps 14. Fluid diverter ribs 21 (sometimes also hereinafter referred to as "baffles") are positioned between upper and lower headers 18 and 20.

Upper header 18 includes side walls 26 and a removable cover 28. Cover 28 may be hinged or otherwise connectable to upper header 18 and is most preferably sealable to protect against water leakage. Handle 127 connects to cover 28 and insures that cover 28 remains in a closed position during module operation. Raising and lowering eyes 30 are connected to side walls 26 for ease of location and are used to move module 12 into and out of channel 10.

Module 12 is equipped with electrical connector 32 on one of side walls 26 which permits multiconductive cable 34 to connect between lamps 14 and various power and control devices. Side wall 26 also includes air supply connector 36 to introduce air, which is the especially preferred fluid, for jacket cleaning, into module 12. Air supply connector 36 in side wall 26 leads to air supply pipe 38, which is preferably located interiorly of upper header 18, and in one embodiment in turn connects to at least one of legs 22, which is hollow, and channels air to lower header 20. Air supply connector 36 is dimensioned to receive air supply hose 37, which connects to an air supply.

Upper header 18 preferably contains wiring associated with lamps 14, electronic lamp controllers 100, and/or ballasts 102, lamp monitor 104, data collector 106 and a number of devices not shown herein that contribute to the operation of the system and the module. Such devices include connecting wires, coolant devices such as fans, blowers and the like, as well as alarms, readouts, microprocessors, etc. The need or desirability of these items is influenced by the particular characteristics of each treatment facility.

Side walls 26 of upper header 18 form a rectangle around upper header floor 40. One side wall 26 includes access for air supply connector 36, which connects to air supply pipe 38. Upper header floor 40 contains a multiplicity of jacket receiving openings 41, which are provided with threaded collars (not shown) to receive and maintain jackets 24 in place.

Lamps 14 are located interiorly of jackets 24 and have wires extending upwardly into upper header 18 which connects to appropriate power supply and control devices. The top openings of jackets 24 need not be closed or sealed. Use of rubber-like o-rings also provide a seal against ingress of fluids and a comparatively soft cushion for jackets 24, which are most preferably made from quartz glass, and may be susceptible to cracking and breaking during shipment or module placement in channel 10 or upon subsequent movement of module 12.

FIGS. 3 and 4 show a preferred embodiment of lower header 20. Lower header 20 connects to upper header 18 by legs 22, preferably located in the respective corners. At least one leg 22 is hollow and fluid tight to receive air from air supply pipe 38 located in upper header 18. In the preferred embodiment lower header 20 consists of top pan 50, outer side walls 52 and floor 54 (which may be omitted in certain applications). Top pan 50 contains a multiplicity of jacket receiving openings 56, the number and positioning of jacket receiving openings 56 corresponding to the number and positioning of openings in upper header 18. Bracket 57 strengthens the entire structure.

Fluid diverter ribs 21 are positioned and aligned with rows having a lamp at the end of the row positioned away from the side of the module relative to lamps on the ends of adjacent rows. Top pan 50 also includes a multiplicity of exit holes 58 which permit air to flow outwardly of lower header 20 through top pan 50 and into contact with jackets 24 to allow self-cleaning of jackets 24.

Figure 5:
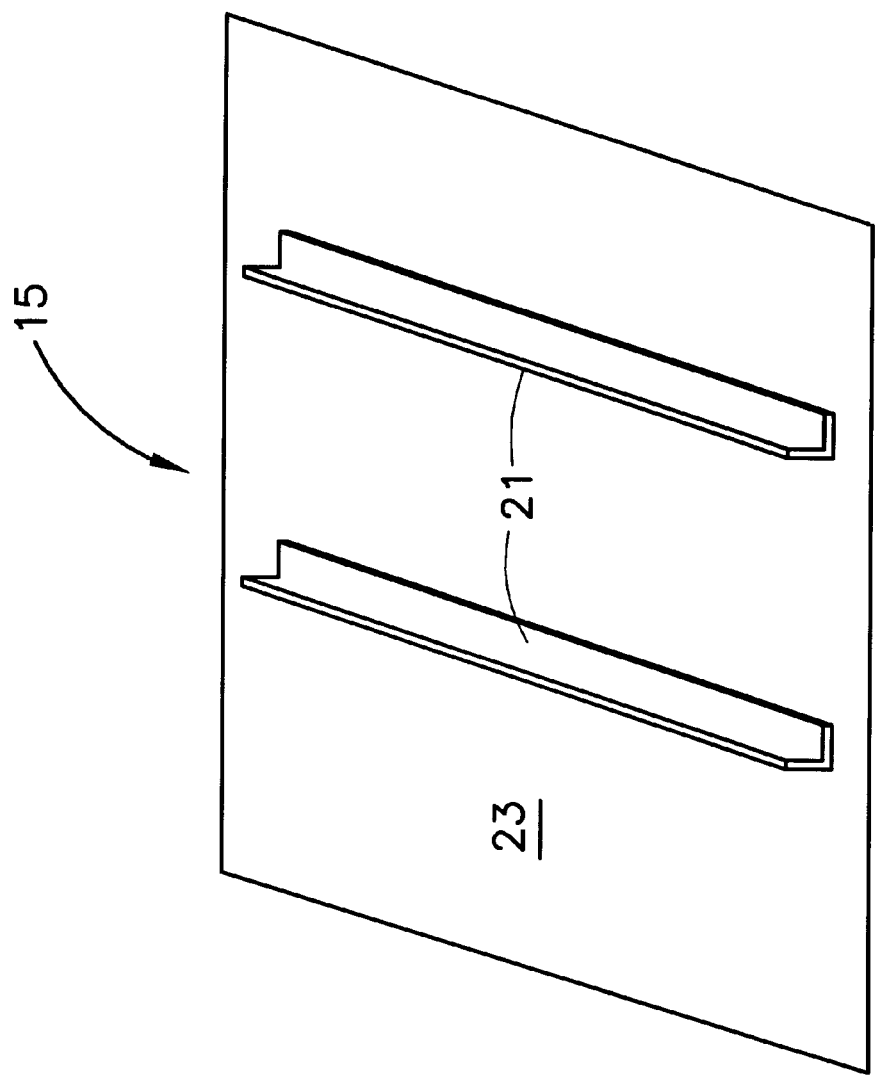
FIG. 5 shows a schematic perspective view of one embodiment of a fluid diverter in accordance with aspects of the invention.
Figure 6:
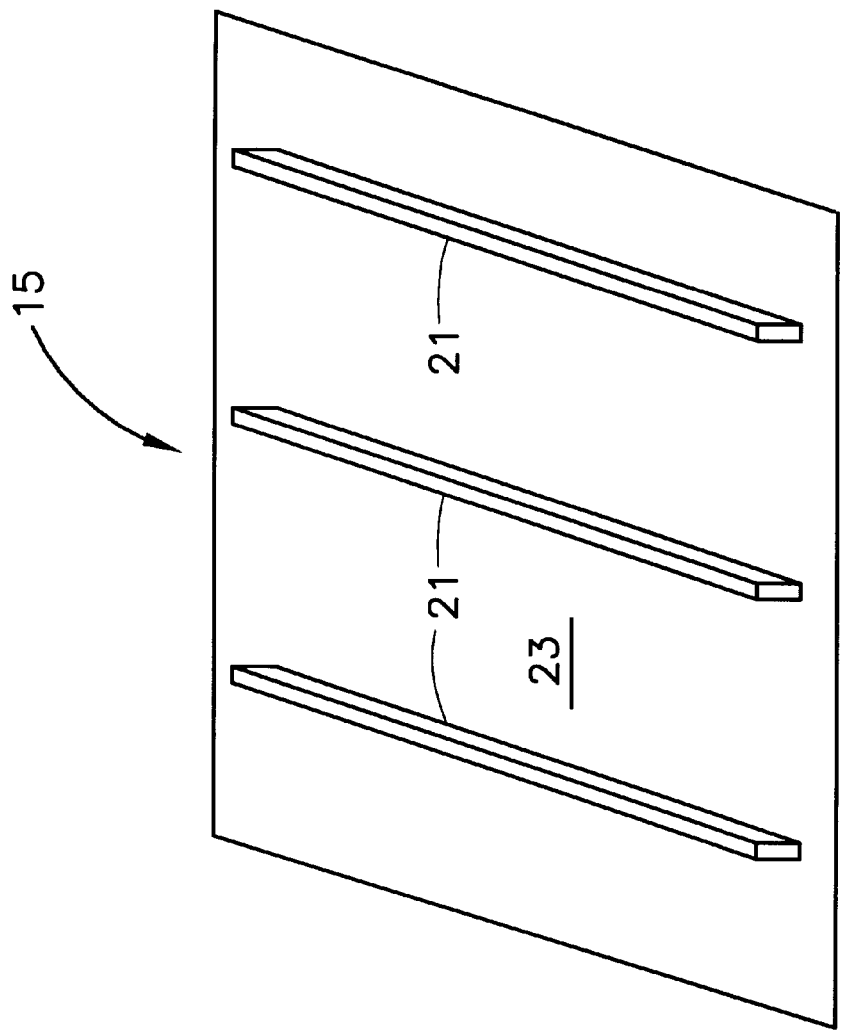
FIG. 6 shows a schematic perspective view of another embodiment of a fluid diverter in accordance with aspects of the invention.

FIGS. 5 and 6 show two embodiments of fluid diverters 15 removed from a module 12. The fluid diverter in FIG. 5 includes a pair of fluid diverter ribs 21 similar to those shown in FIG. 3. Ribs 21 are attached to sheet 23. Sheet 23 is preferably connected to legs 22 of a module 12 on a side portion thereof that lies adjacent to side wall 17 of channel 10. Sheet 23 may be connected to legs 22 in any manner well known in the art such as with screws, clips, adhesives and the like. Fluid diverter ribs 21 in FIG. 5 are shown as being made from so-called "angle iron" that is most preferably welded to sheet 23.

Fluid diverter 15 as shown in FIG. 6 is similar to that in FIG. 5 except that it contains an additional fluid diverter rib 21. Fluid diverter rib 15 is for use with a module having an additional row of lamps having its end lamp positioned away from the side of the module relative to lamps on the ends of adjacent rows. Of course, it is within the scope of the invention that any number of diverter ribs such as rib 21 may be used depending upon the number and positioning of staggered rows of lamps.

Figure 7:
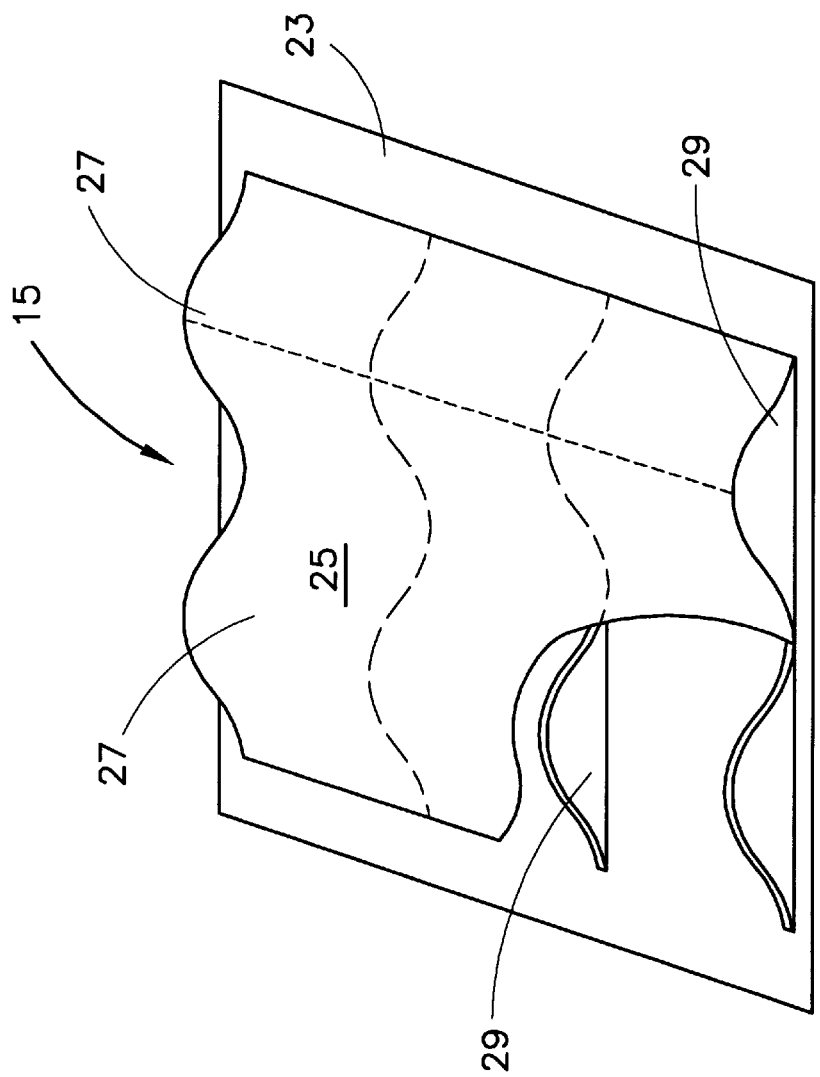
FIG. 7 shows a schematic perspective view, partially broken away for ease of understanding, of yet another embodiment of a fluid diverter in accordance with aspects of the invention.

FIG. 7 shows an alternative embodiment of a fluid diverter 15. Like the fluid diverters 15 of FIGS. 5 and 6, it includes a sheet 23 that is attached to module 12 in the same manner as the fluid diverters 15 in FIGS. 5 and 6. However, in place of fluid diverter ribs 21, a curved sheet 25 is substituted. Curved sheet 25 has a series of undulations 27 that, like diverter ribs 21, are positioned in rows having end lamps positioned away from the side of the module as compared to adjacent rows having the end lamp positioned closer to the side of the module. The undulations are supported by a series of supports 29. The supports 29 are shaped to closely receive the undulations 27 of sheet 25. It is contemplated that supports 29 may be omitted depending on the type and strength of material chosen for curved sheet 25. Each undulation has an apex as denoted by the dashed line on curve sheet 25, the apex being positioned in alignment with the row of lamps.

Figure 8:
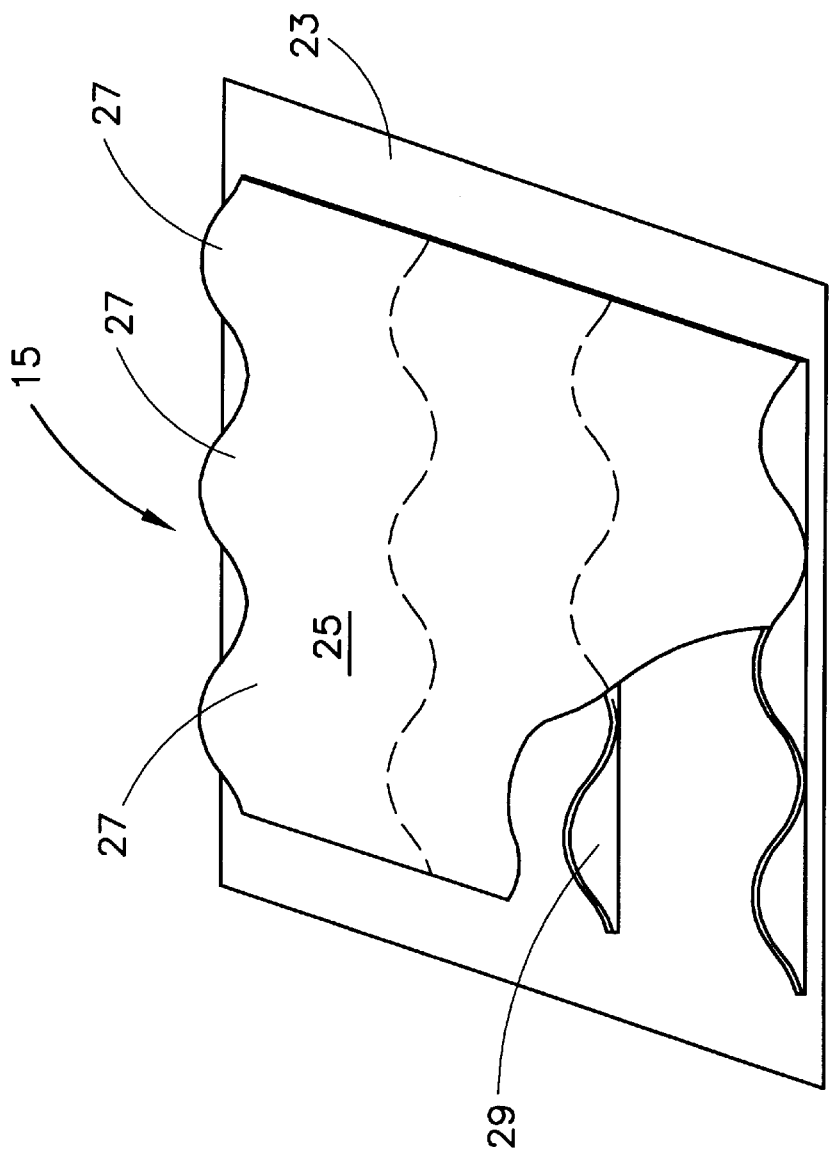
FIG. 8 shows a schematic perspective view, partially broken away, of still another embodiment of a fluid diverter in accordance with aspects of the invention.

FIG. 8 shows yet another fluid diverter 15 similar to that shown in FIG. 7 except that it has a third undulation 27 on sheet 25. Supports 29 are connected to sheet 23 in any manner known in the art such as by screws, bolts, clips, adhesives, welding and the like. Similarly, curved sheet 25 is secured to the supports 29 in a similar manner.

Figure 9A:
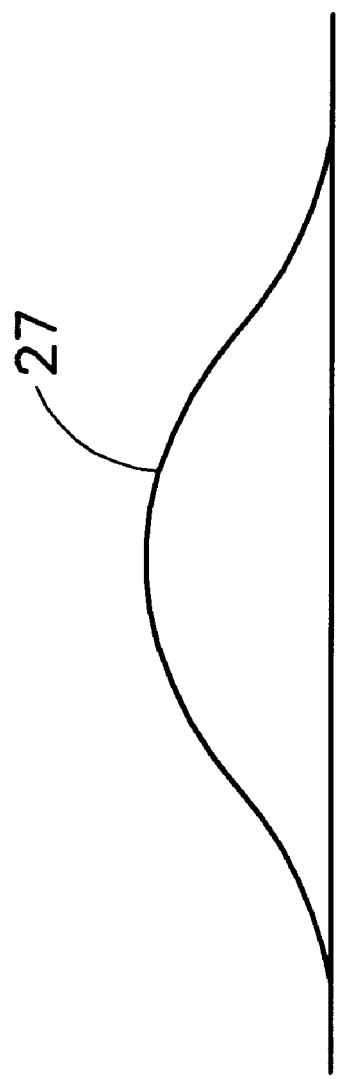
FIGS. 9A and 9B show perspective views of fluid diverter ribs utilized in accordance with aspects of the invention.
Figure 9B:
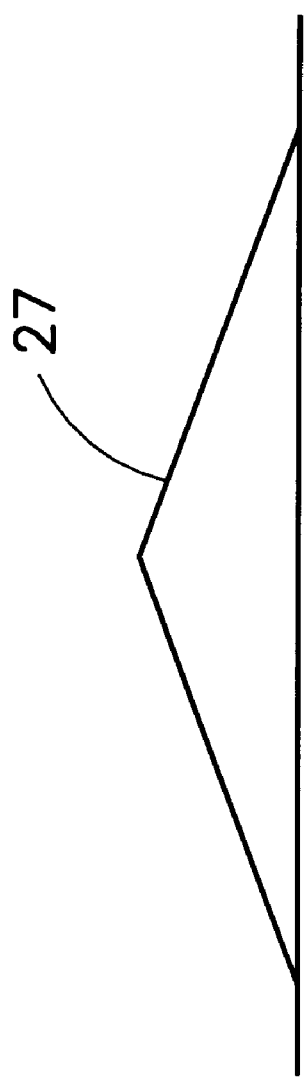

As shown in FIGS. 9A and 9B, undulations 27 need not be rounded as depicted in 9A, but may be constructed from obtuse angles as shown in FIG. 9B.

FIG. 10 shows a sectional view of a module 12 placed within a channel between channel walls 17. Fluid diverter ribs 21 lie close to but not directly against walls 17. Small spaces exist between walls 17 and module 12 so that module 12 can be inserted into and removed from the channel. In the module 12 shown in FIG. 10, fluid diverter ribs 21 extend between lower header 20 and upper header 18 (not shown). Unlike some other embodiments of the invention, there is no sheet 23 onto which fluid diverter ribs 21 are connected or mounted. Instead, fluid diverter ribs 21 are directly connected between upper header 18 and lower header 20. Therefore, the small space that exists between walls 17 and module 12 does not result in the passage of fluids beyond the module without obtaining the proper UV dose.

FIG. 11 shows another embodiment of a module 12 in position between walls 17 in a channel. Once again, a small space exists between wall 17 and module 12 so that the module can be inserted into and removed from the channel. This module also has fluid diverters in the same manner as the embodiment shown in FIG. 10. However, the diverters are shaped slightly different and also serve as the support legs between lower header 20 and upper header 18 (not shown). Thus, legs 22 perform the dual function of supporting or connecting the headers together and providing the fluid diversion task of fluid diverter ribs 21 from FIG. 10. It is not necessary to have additional support legs 22 in the respective four corners of the module, although it is preferred. Also, it is preferred for at least one of the legs 22 to serve as a conduit to channel air from upper header 18 down to and into lower header 20.

FIG. 12 shows still another embodiment of the invention wherein a module 12 is located within a channel between walls 17. Fluid diverters 15 are similar in shape to the diverter undulation 27 from FIG. 9B. Unlike the modules shown in FIGS. 10 and 11, undulations 27 are mounted to sheets 25 that are connected to the side of the module. A small space exists between wall 17 and module 12 so that module 12 can be inserted into and removed from channel 10. It is important that fluids not flow behind sheets 25 of fluid diverters 15 inasmuch as this would reduce or eliminate the possibility of such fluids being subjected to the proper dose. Accordingly, the upstream edges of module 12 are supplied with seal members 31 which extend from legs 22 toward and into contact with walls 17. This prevents fluid from flowing around module 12 and behind sheets 25. While seal members 31 are shown as being strips of rubber connected to legs 22 and into sealing contact with wall 17, other shapes, sizes and types of materials may be utilized.

Figure 13:
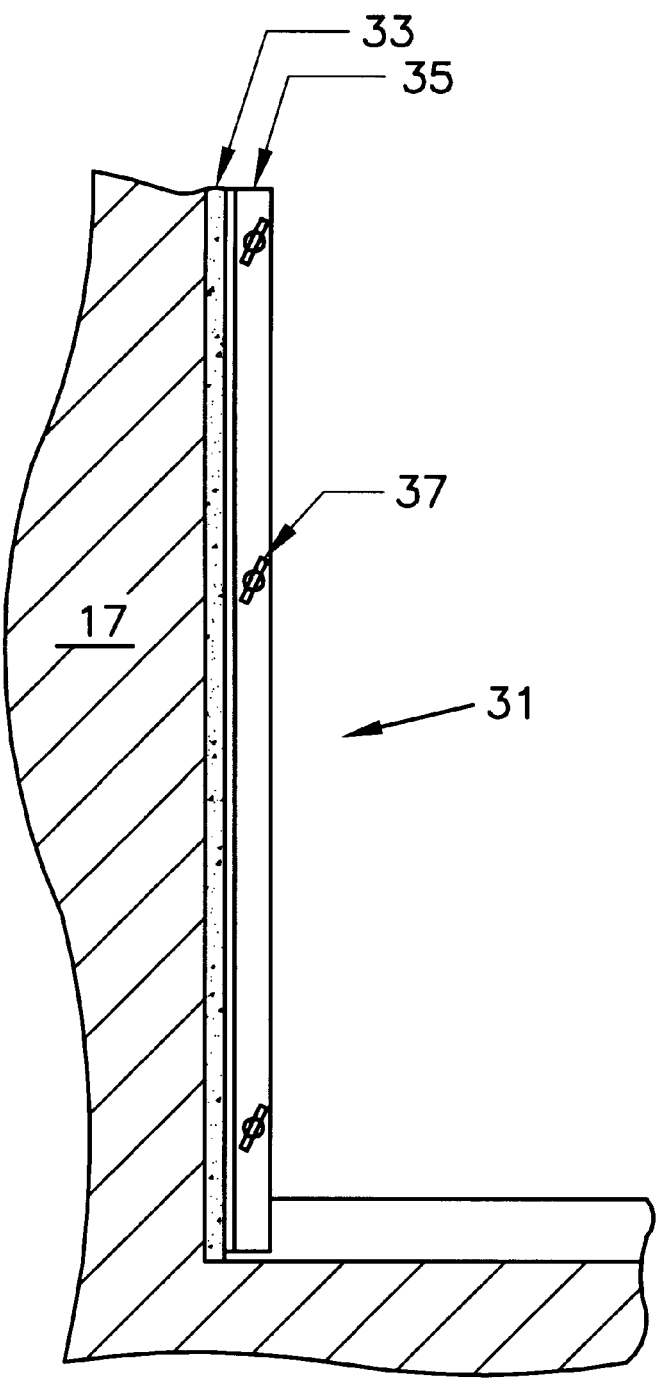
FIG. 13 shows a portion of a fluid treatment channel, taken in section, and including a front elevational view of a sealing member in accordance with aspects of the invention.

FIG. 13 shows sealing member 31 sealingly engaging the side wall 17 of a channel. Seal member 31 includes a gasket 33 that directly contacts the surface of wall 17 and is attached to a gasket angle 35. Gasket angle 35 has adjustment slots 37 through which a means to attach gasket angle 35 are utilized to attach the sealing member 31 to leg 22 (not shown) of a module. Such means can include nuts and bolts, clips, adhesive and the like. Sealing member 31 should extend from the floor of the channel to at least the top surface of fluids in the channel.

Figure 14:
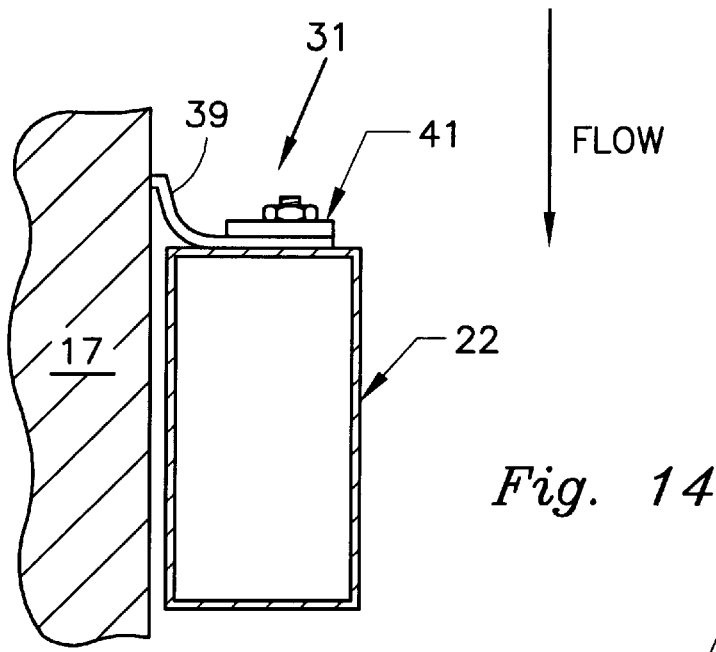
FIG. 14 shows a portion of a side wall of a channel, taken in section, together with a sealing member and module leg, also taken in section.
Figure 15:
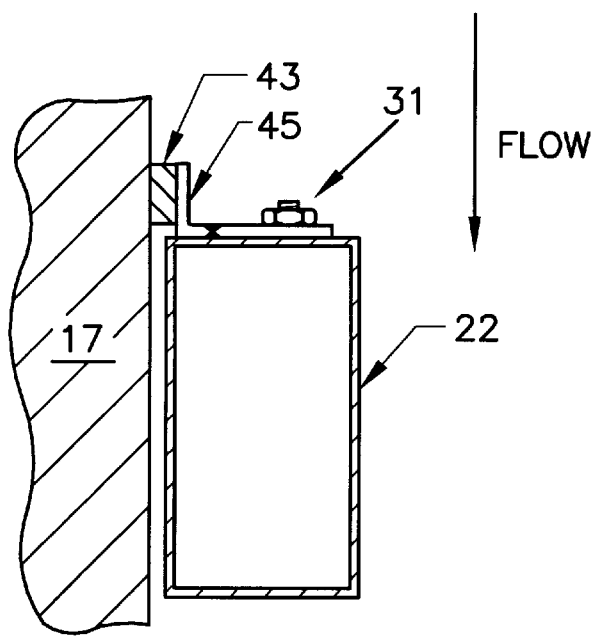
FIG. 15 shows another embodiment of a sealing member taken from FIG. 14.
Figure 16:
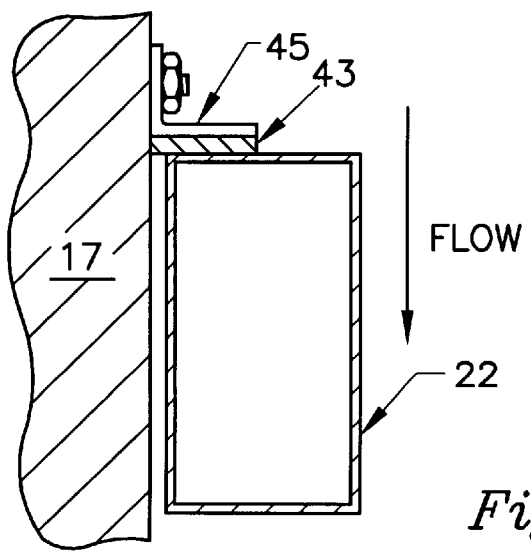
FIG. 16 shows yet another embodiment of a sealing member shown in FIG. 14.

FIGS. 14, 15 and 16 show sectional views of alternate embodiments of a sealing member 31 attached to leg 22 of the module. The sealing member 31 shown in FIG. 14 includes a sealing strip 39 and a backing strip 41 which are secured to leg 22 by a nut and bolt arrangement. Of course, other means of securing sealing member 31 to support leg 22 are within the scope of the invention.

FIG. 15 shows a sealing member 31 with a gasket 43 that is sealingly located between side walls 17 and gasket angle 45. Gasket angle 45 is secured to support leg 22 with a nut and bolt arrangement.

Finally, FIG. 16 shows a gasket angle 45 sealingly connected to wall 17 through a nut and bolt arrangement with a gasket 43 interposed between gasket angle 45 and support leg 22 to thereby affect sealing action.

It is also possible that fluid diverters 15 are mounted to channel side walls 17 instead of being fixed to modules 12 so long as the appropriate positioning of fluid diverters 15 relative to lamps 14 is maintained and so long as appropriate sealing of fluid diverters 15 against walls 17 is insured.

Figure 17:
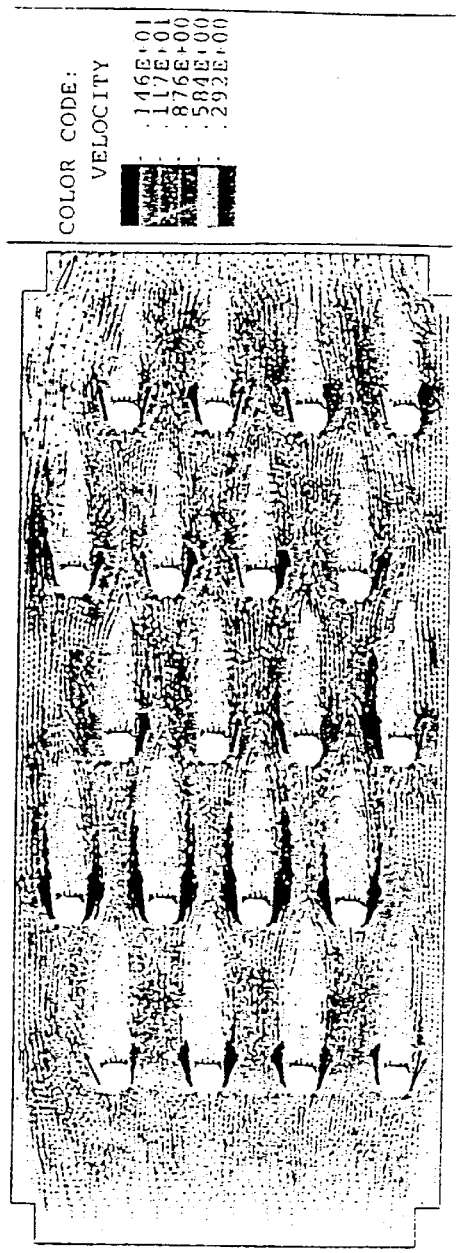
FIG. 17 shows a schematic top plan view of a horizontal plane within a prior art module positioned within a channel and fluids flowing through the channel, the fluid flow being represented by a velocity vector field.
Figure 18:
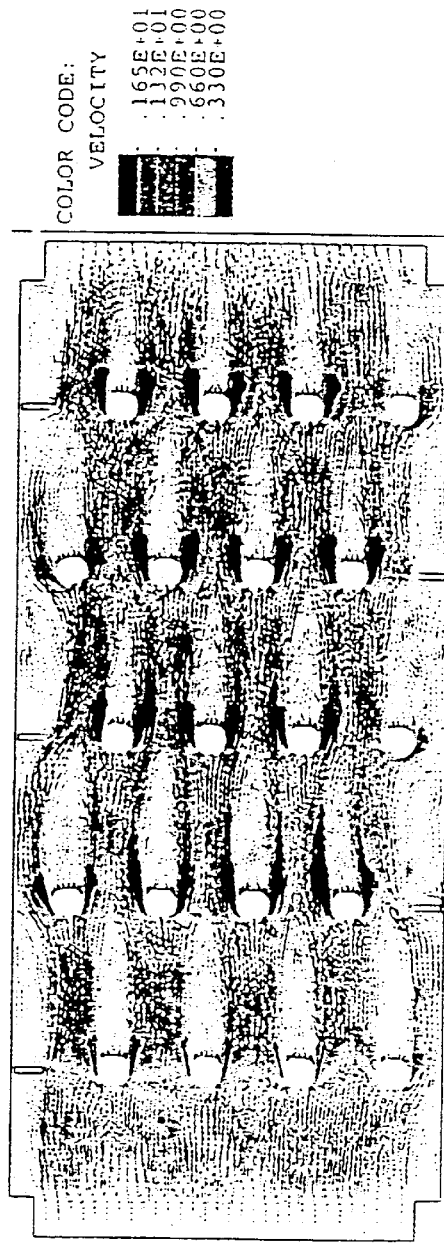
FIG. 18 shows a schematic top plan view of a horizontal plane within a module of the invention positioned within a channel and fluids flowing through the channel, the fluid flow being represented by a velocity vector field.

FIGS. 17 and 18 show differences between modules of the prior art and systems of the invention during operation. Specifically, FIG. 17 shows a velocity vector field of a module located in a flow of fluid in an open channel. It is readily seen on the sides of the module and the channel that the velocities and their direction are relatively constant. This permits fluids flowing along the side walls to receive relatively low UV dosages. Of course, this provides for the highly detrimental likelihood of bacterial particles escaping the module with a less than desired UV dosage.

This is in sharp contrast to the velocity vector field of a module in an open channel as shown in FIG. 18. In that case, the fluid diverters divert fluids toward UV lamps at positions that otherwise would pass relatively far from the nearest UV lamps, thereby permitting a lower UV dosage. The fluid diverters of the invention locally increase velocity and, simultaneously, cause changes in fluid flow vectors so that the fluids are diverted closer to the vicinity of UV lamps so that a more uniform UV dosage is applied to all of the fluid in the system.

Figure 24:
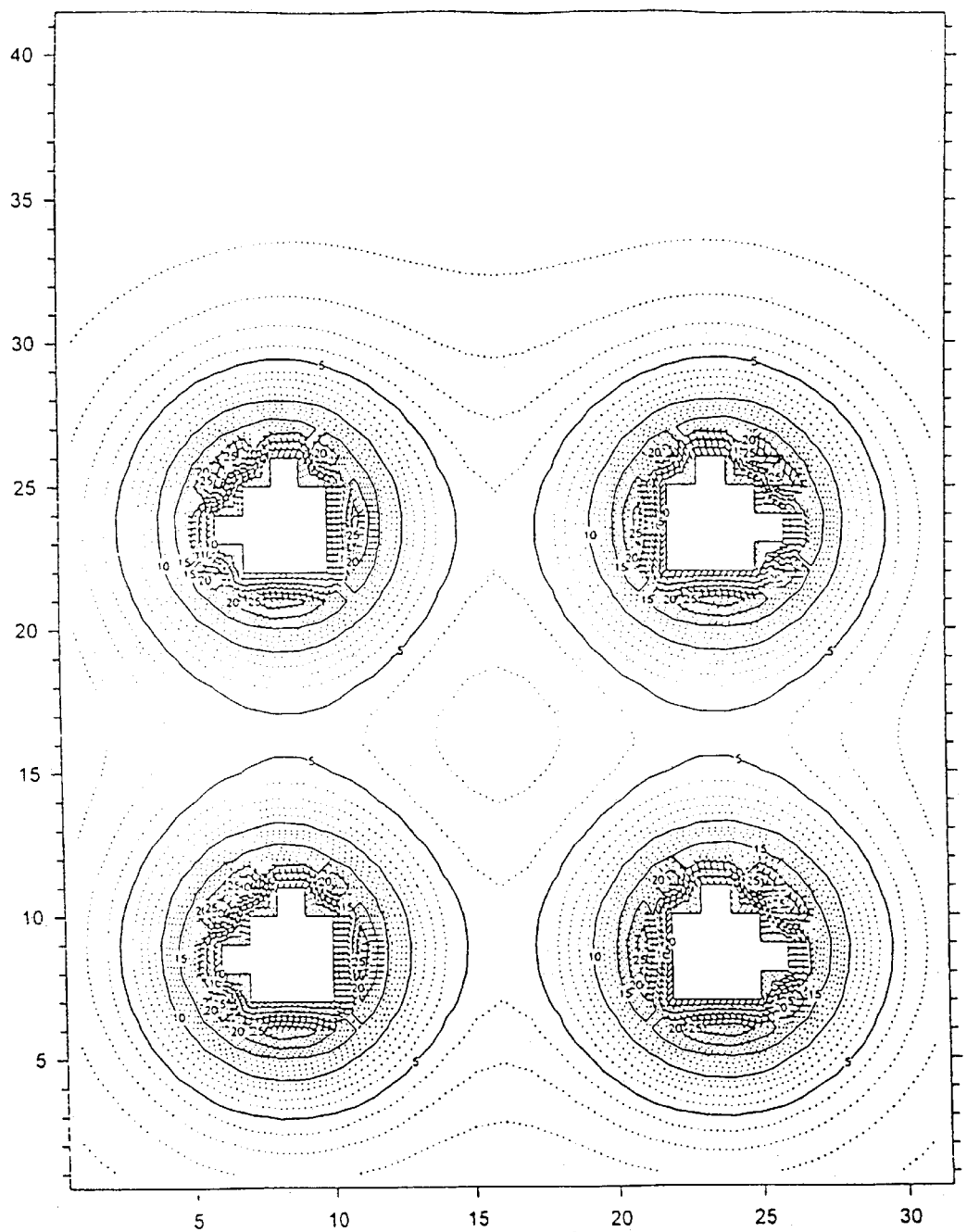
FIG. 24 shows an intensity field generated by horizontally oriented UV lamps in a prior art rack.

In horizontal systems, the radiation intensity field demonstrates steep gradients in planes perpendicular to the direction of flow such as that shown in FIG. 24. We found that variations in intensity of a factor of 30 or more are common for these systems. These variations imply corresponding variations of a factor of 30 or more in local reaction rates with these same cross sections. In conventional horizontal systems, very limited transverse mixing is achieved within the irradiated zone. Therefore, particles (e.g., bacteria or viruses) which enter the irradiated zone on a given streamline are likely to remain on that streamline. Furthermore, the streamlines which have the lowest UV intensity are those which are located farthest from the stationary structures within the system (the UV lamps and the channel walls). These streamlines are largely coincident with those having the highest velocity. Therefore, particles which enter the irradiated zone of a horizontal system on these streamlines experience low radiation intensity and short residence time.

Hence, these particles tend to experience a lower radiation dose. A lower radiation dose provides a relatively high likelihood of the particle avoiding photochemical change. Though particles which enter the system on other streamlines may experience much higher doses, this uneven distribution of radiation dose does not achieve optimal process performance. In disinfection applications, this implies that the vast majority of organisms which remain viable following irradiation are those which enter the irradiated zone on streamlines which provide the opportunity for exposure to a low radiation dose.

We discovered that changes to the geometry of horizontal UV systems are those which accomplish improvements in the radiation dose distribution. This has been accomplished as follows: Methods by which microorganisms and fluid elements are prevented from entering or flowing through regions of low intensity and high velocity. This has been accomplished by filling in or displacing areas of low intensity. As such, the particles which enter the system are physically prevented from entering these low efficiency zones. The result is a shift of the dose distribution toward larger doses and an improvement in performance.

Figure 19:
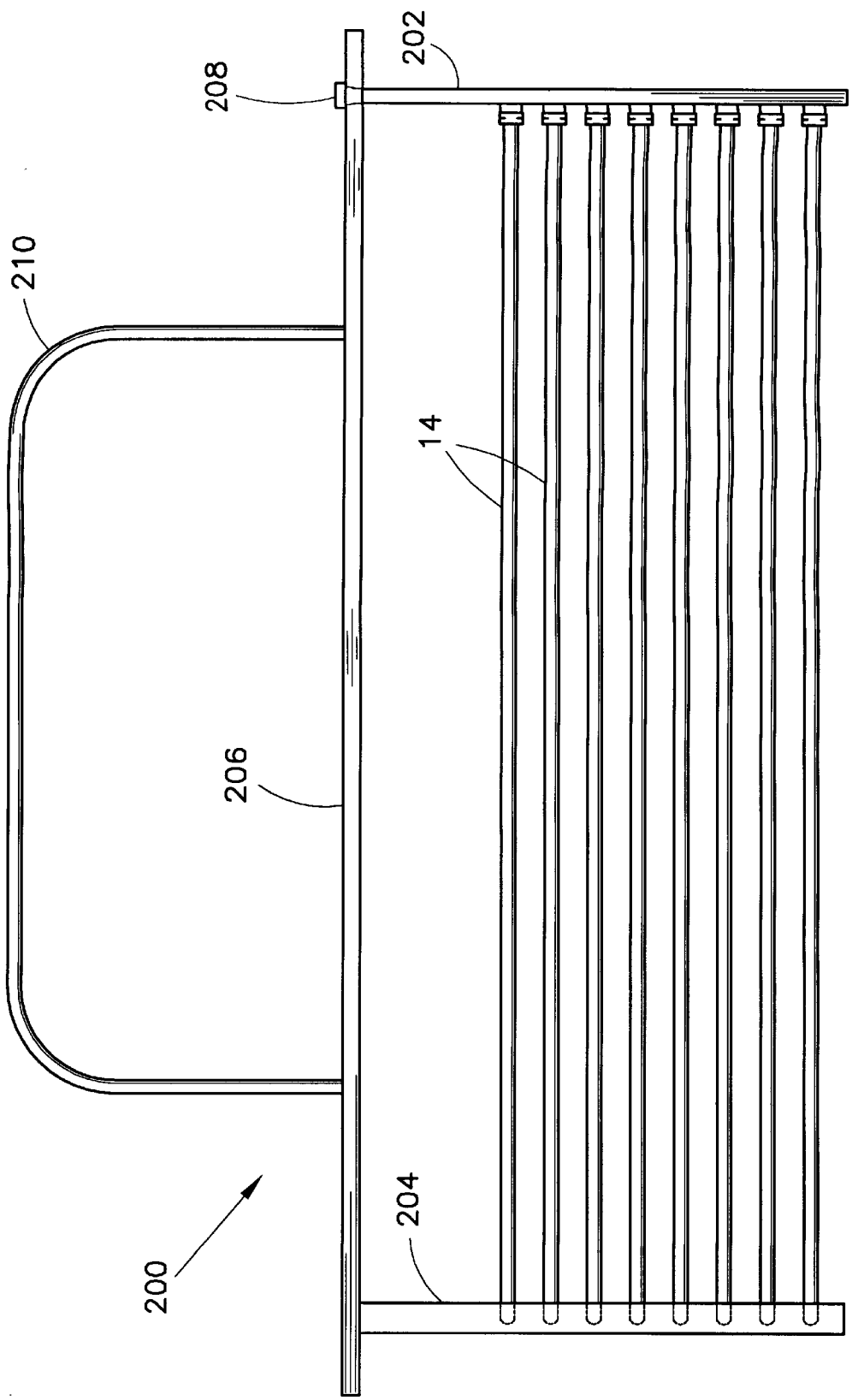
FIG. 19 shows a front elevational view of a rack of horizontally-oriented UV lamps in accordance with the prior art.

FIG. 19 shows a typical rack 200 containing a multiplicity of horizontally oriented lamps 14. Rack 200 consists of legs 202 and 204 which receive and maintain lamps 14 in a desired horizontal, spaced-apart orientation. Legs 202 and 204 connect to a horizontally oriented header bar 206. A wire 208 extends outwardly from header bar 206 and leg 202. Wire 208 connects to the respective lamps 14 in the same manner as described with respect to module 12. Rack 200 also has a removal handle 210 to facilitate placement of rack 200 within a channel.

As noted above, a typical open channel horizontal UV disinfection system utilizes a multiplicity of racks 200 positioned side by side with the horizontally oriented lamps 14 being positioned parallel to the flow of fluid through the channel.

Figure 20:
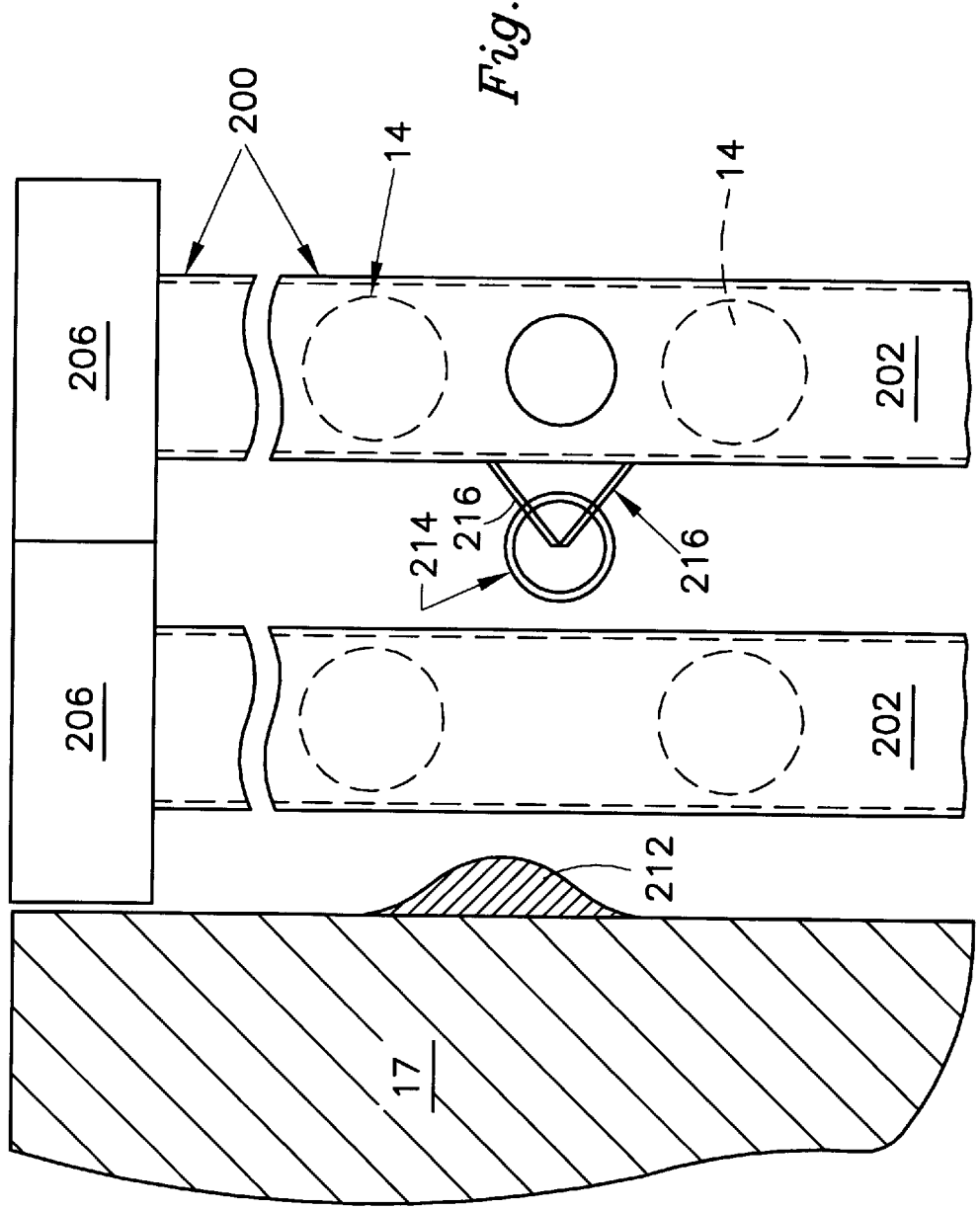
FIG. 20 shows a schematic view of portions of lamp racks of the invention positioned within a portion of a fluid disinfection channel, the channel being taken partially in section.
Figure 21:
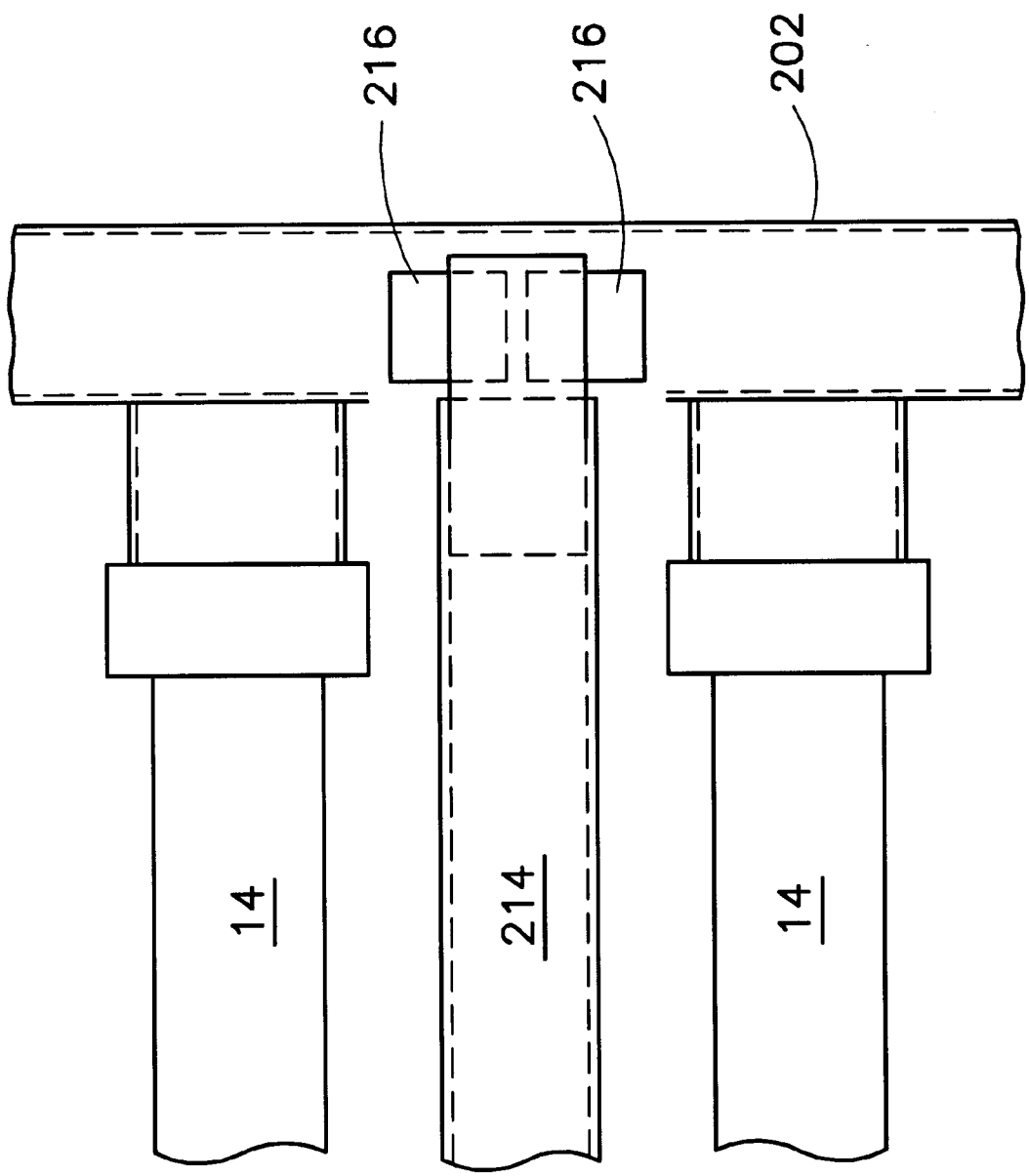
FIG. 21 shows a side elevational view of a portion of the racks shown in FIG. 20.

FIGS. 20 and 21 depict portions of two racks 200 located within a channel and positioned against side wall 17.

A fluid displacer piece or filler piece 212 is mounted in a position which displaces fluids flowing through the channel toward lamps 14 of the rack on the left-hand side of FIG. 20. This ensures that a desired UV dosage is received for the fluid that would otherwise pass in the area taken by the volume of filler piece 212.

Similarly, the right-hand rack 200 additionally comprises a filler tube 214 that is substantially horizontally mounted onto leg 202 with supports 216. Once again, in the same manner as filler piece 212, filler tube 214 displaces fluid toward lamps 14 from a volume of space that would otherwise have been subjected to a decreased UV dosage.

Figure 22:
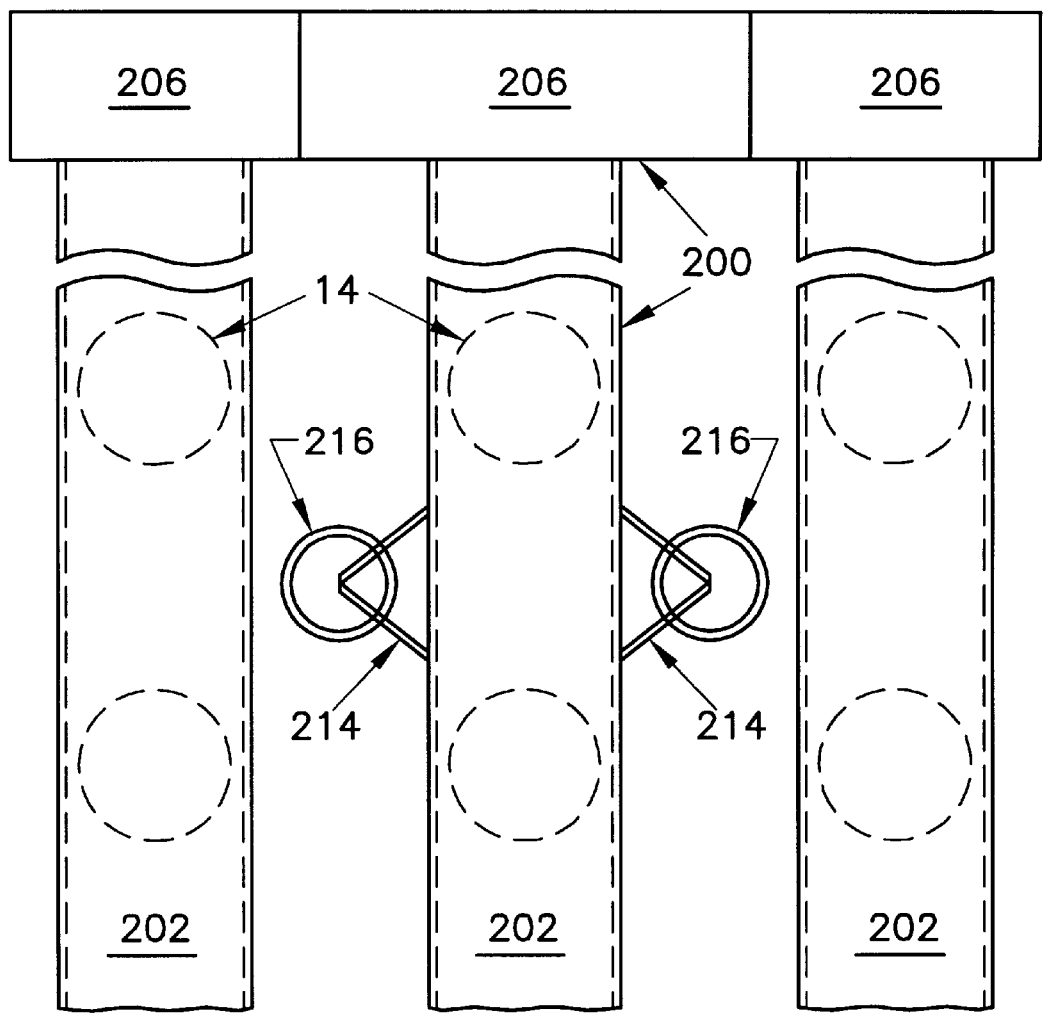
FIG. 22 shows a schematic front elevational view of portions of three racks positioned side by side in accordance with aspects of the invention.

FIG. 22 shows another embodiment of the invention wherein a rack 200 is equipped with two filler tubes 214, each filler tube being connected to a support 216. Also, header bar 206 in the middle rack 200 has been widened to accommodate the additional filler tube 214. Of course, racks 200 on the right- and left-hand sides of FIG. 21 would also lie adjacent to filler pieces 212 in the event that they are directly adjacent channel walls 17. The filler tubes 214 and filler pieces 212 are preferably made from PVC or stainless steel, although other suitable materials may be used.

Figure 23:
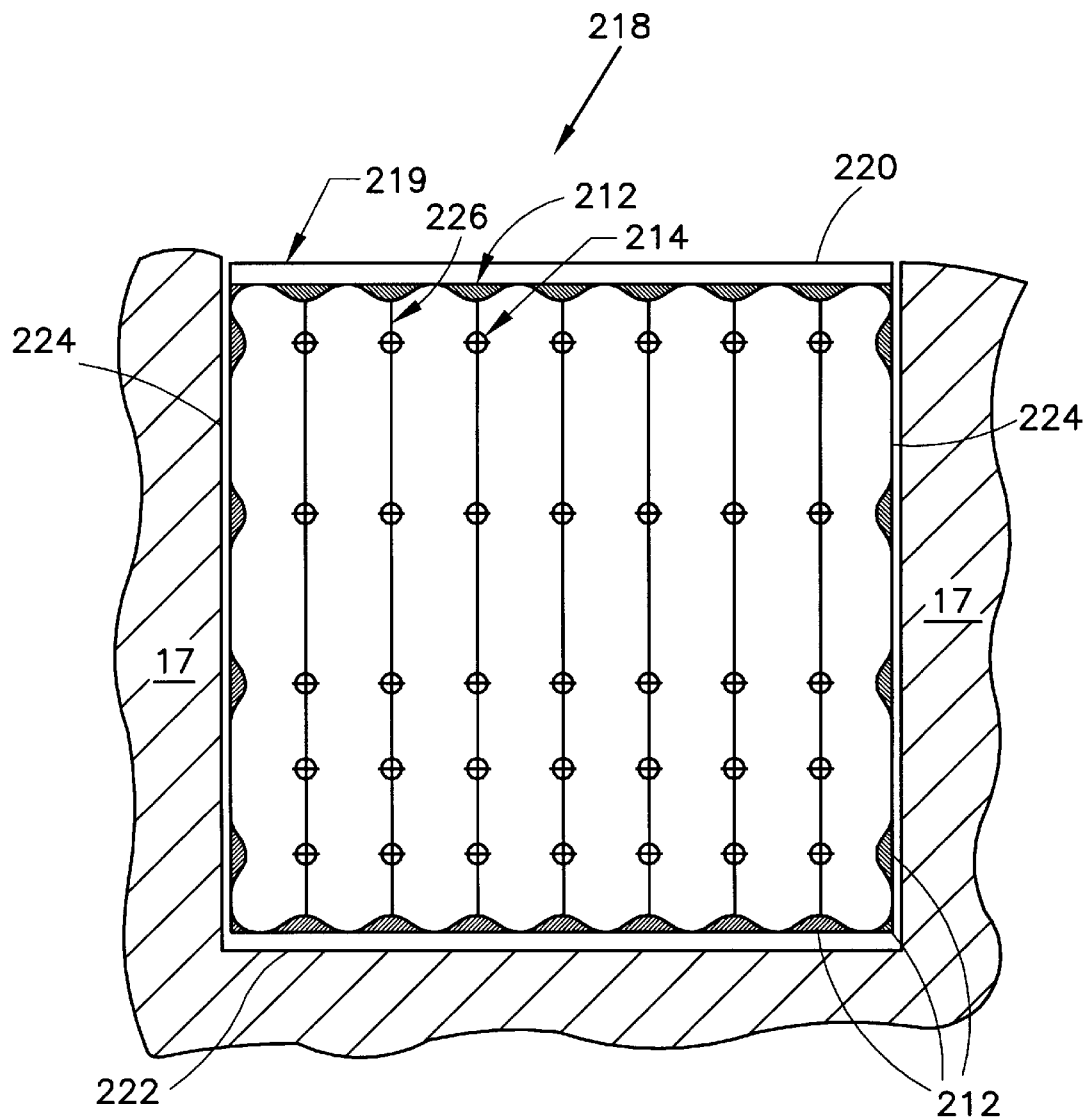
FIG. 23 shows a sectional view of a UV disinfection channel containing a fluid displacement support system in accordance with aspects of the invention.

FIG. 23 shows another embodiment of the invention wherein a filler support system 218 is positioned within a channel, although racks 200 are not shown as being present. Filler grid 219 includes an upper header bar 220, a lower header bar 222 with a pair of opposed header legs 224 located at their respective ends.

Grid 219 also has a series of filler support legs or stringers 226 positioned in a spaced-apart manner between upper header bar 220 and lower header bar 222. A series of spaced-apart substantially horizontally-oriented filler tubes 214 are connected to the support legs 226. Of course, the filler support system 218 includes a pair of spaced-apart header grids 219 supporting the filler tubes 214.

Racks 200 (not shown) are positioned between filler support legs 226 in the same orientation with respect to the filler tubes as shown in FIGS. 20–22.

Filler support system 218 also includes a multiplicity of filler pieces 212 positioned on upper header bar 220, lower header bar 222 and side headers 224 in appropriate positions. This arrangement allows the entire filler system 218 to be placed within and removed from the channel in a rapid and simple manner. It also provides for an optimal application of UV dosage to fluids passing through the disinfection channel.

Figure 25:
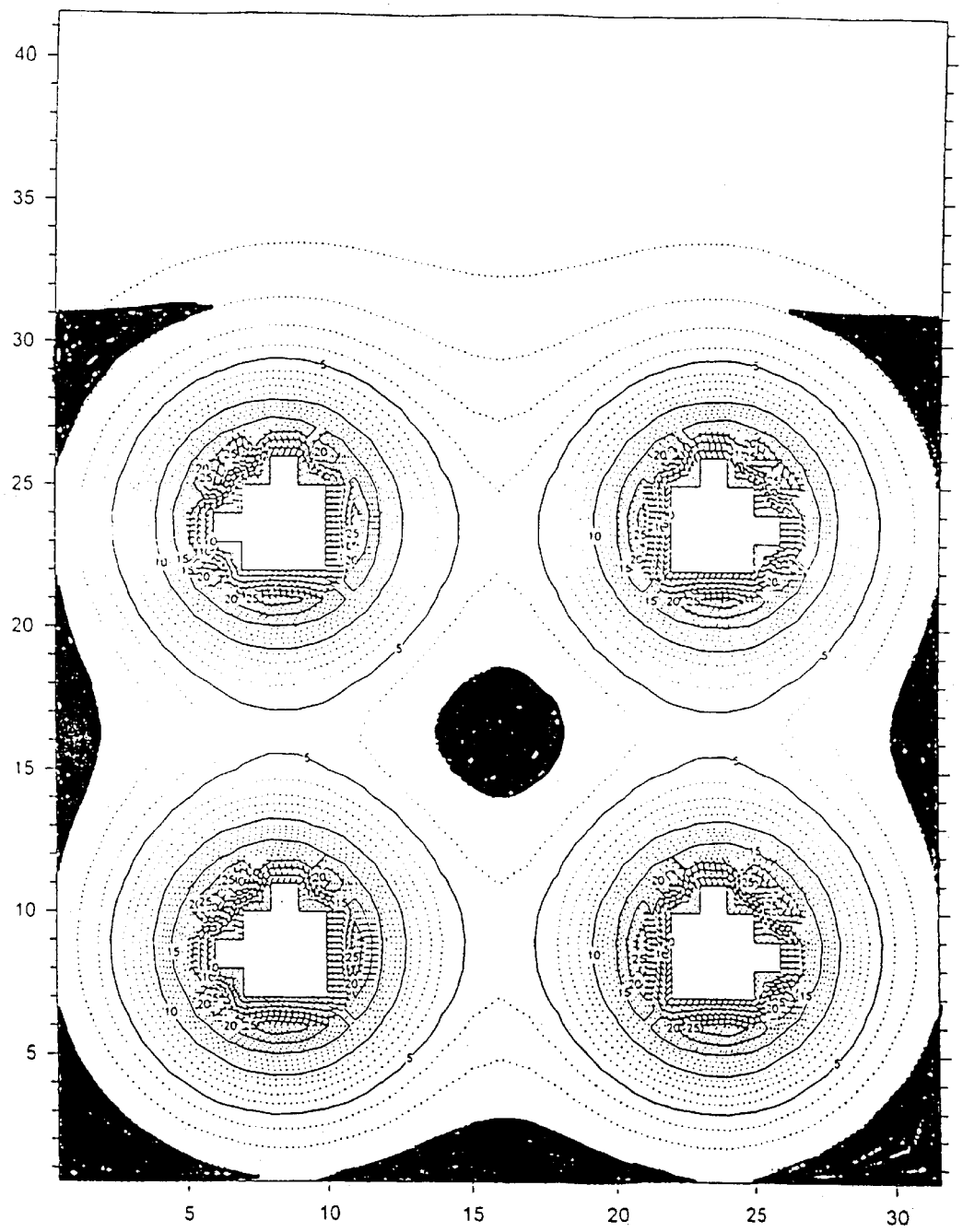
FIG. 25 shows an intensity field in accordance with aspects of the invention.

The advantages of the systems shown in FIGS. 20–23 is illustrated in FIGS. 24 and 25. FIG. 24 shows the intensity of lamps, such as those shown in FIGS. 20–23, in units of mW/cm$^2$. Of course, the higher intensity is registered closest to the UV lamps and diminishes with distance from the lamps. Such low intensity areas permit fluid to pass by the lamps in a manner that portions of the fluid are subjected to high dosage and those fluids passing at relatively large distances from the lamps are subjected to low intensity, which is frequently inadequate to disinfect the fluid.

FIG. 25 shows in a schematic sense the filler tubes 214 from FIGS. 20–23 and the filler pieces 212 from FIGS. 20–23. These filler pieces and filler tubes fill or displace fluids from the low intensity areas, thereby ensuring that an adequate UV dosage is applied to all of the fluids in the fluid disinfection system.

The number and configuration of modules necessary to disinfect a given waste water stream flowing through channel 10 is calculated by methodology well known in the art and not discussed herein. The proper number of modules and racks are then positioned within channel 10 to ensure that an effective dose of ultraviolet radiation is administered to the fluid as it flows. Modules 12 and racks 200 may be employed singly, in rows across channel 10, in banks of modules downstream from one another or in other arrangements known in the art. Of course, in the event that modules 12 are used in rows, it is highly advisable to utilize a seal between adjacent legs of adjacent modules to prevent water from passing between the modules without full treatment. Also, similar precautions are advisable when modules are placed in series so that adjacent downstream and upstream legs prevent passage of untreated fluid.

The configuration and placement of modules 12 within the channel causes lower header 20 to be the effective floor of channel 10. This is important in insuring that complete irradiation of the waste water be achieved. As shown in FIGS. 1–3, the construction of the lower portion of module 12 surrounding lower header 20 permits water to flow through channel 10, above top pan 50, in a relatively undisturbed pattern which facilitates irradiation of the fluid as it passes by module 12.

Legs 22 are sized and located to virtually eliminate blockage of irradiating ultraviolet radiation and upper header 18 is most preferably totally removed from the water to eliminate obstruction of ultraviolet radiation near the top of the water flow. The construction of the invention minimizes and substantially eliminates water passing module(s) 12 without being exposed to the minimum required dosage of ultraviolet radiation. Prior art systems have typically contained structure that results in obstructions causing uneven irradiation or blind spots as the waste water passes the lamps. Of course, this is highly undesirable as it results in less than complete application of ultraviolet dosages.

It is also an advantageous feature of the invention that the placement of the bottom portion of lamps 14 within jackets 24 permits the lowermost portion of lamps 14 to provide ultraviolet coverage along top pan 50, whereas prior art systems typically do not provide a structure permitting adequate irradiation of the lowermost portion of the channel. The electrodes of lamps 14 are sufficiently recessed so that ultraviolet radiation projecting outwardly from the lamps fully covers the fluid flowing past the lamps.

Although this invention has been described in connection with specific forms thereof, it will be appreciated that a wide variety of equivalents may be substituted for the specific elements described herein without departing from the spirit and scope of this invention as described in the appended Claims. For example, the upper and lower headers 18 and 20 need not be totally vertically aligned so that the lamps are perpendicular to the headers. The upper and lower headers 18 and 20 can be arranged so that the lamps are aligned out of vertical. The lamps may extend between the headers at various angles to vertical, including horizontal.

It is also possible to employ module 12 without floor 54 and inner side walls 55 of lower header 20. The integral construction of top pan 50 and outer side walls 52 permits air to reside interiorly of lower header 20 without escaping prior to exiting from exit holes 58. Floor 54 can also be used in a removable configuration which permits easy access to exit holes 58 from both sides of top pan 50 but helps to prevent collection of suspended solid around lower header 20.

Modules 12 may be connected to various types of power and control devices. The power supply is typically found at the site and is preferably a standard commercial building type, although modules 12 may be connected to alternate supplies such as generators and the like. Modules 12 are most preferably constructed from stainless steel and welded together, although other materials and assembly methods may be substituted or added.

What is claimed is:

1. An immersible and portable module for irradiating fluids comprising:
    a multiplicity of ultraviolet radiation producing lamps;
    a first header for receiving and maintaining in position said multiplicity of ultraviolet radiation-producing lamps, said first header having upstream and downstream ends and opposed sides;
    a second header for receiving and maintaining in position said multiplicity of ultraviolet radiation-producing lamps, said second header having upstream and downstream ends and opposed sides; and
    fluid flow diverters positioned between said first and second headers and against said opposed sides and adapted to divert fluids, substantially all of fluid flowing adjacent said opposed sides toward at least some of said ultraviolet radiation-producing lamps.

2. The module defined in claim 1 wherein said multiplicity of ultraviolet radiation-producing lamps are positioned in a series of spaced-apart rows, ultraviolet radiation-producing lamps in adjacent rows being staggered with respect to each other in the direction of flow of said fluids.

3. The module defined in claim 2 wherein said fluid flow diverters comprise:
    at least one diverter rib aligned with a row having an ultraviolet radiation-producing lamp at the end of the row positioned away from the opposed side at which the diverter rib is located relative to an ultraviolet radiation-producing lamp on the same end of an adjacent row.

4. The module defined in claim 3 wherein said at least one diverter rib comprises an elongated strip of material having opposed surfaces positioned substantially parallel to a plane extending through said row.

5. The module defined in claim 3 wherein said sheets are flat and have opposed surfaces positioned substantially parallel to the direction of flow of said fluid.

6. The module defined in claim 5 wherein said flat sheet is fixed to and between said first and second headers at one of said opposed sides.

7. The module defined in claim 3 wherein said diverter ribs comprise an elongated sheet of material and have elongated portions positioned at an obtuse angle with respect to each other.

8. The module defined in claim 7 wherein an apex formed by said obtuse angle is substantially parallel to a plane extending through said row.

9. The module defined in claim 7 wherein said sheet of material is attached to a flat sheet having opposed surfaces positioned substantially parallel to the direction of flow of said fluid.

10. The module defined in claim 9 wherein said flat sheet is fixed to and between said first and second headers at one of said opposed sides.

11. The module defined in claim 10 further comprising an elongated sealing member extending outwardly from said upstream end in a direction substantially perpendicular to the direction of flow of said fluid.

12. The module defined in claim 2 wherein said fluid flow diverters comprise:
    a curved sheet having at least one convex undulation aligned with a row having an ultraviolet radiation-producing lamp at the end of the row positioned away from the opposed side at which the undulation is located relative to an ultraviolet radiation-producing lamp on the end of an adjacent row.

13. The module defined in claim 12 wherein an apex of said convex undulation is substantially parallel to a plane extending through said row.

14. The module defined in claim 12 wherein said curved sheet is attached to a flat sheet having opposed surfaces positioned substantially parallel to the direction of flow of said fluid.

15. The module defined in claim 14 wherein said flat sheet is fixed to and between said first and second headers at one of said opposed sides.

16. The module defined in claim 15 further comprising an elongated sealing member extending outwardly from said upstream end in a direction substantially perpendicular to the direction of flow of said fluid.

17. The module defined in claim 1 further comprising an elongated sealing member extending outwardly from said upstream end in a direction substantially perpendicular to the direction of flow of said fluid.

18. A fluid irradiation system comprising:
    a channel through which fluids flow;
    at least one immersible and portable module positioned in said channel, said module comprising:
        a multiplicity of ultraviolet radiation producing lamps;
        a first header for receiving and maintaining in position said multiplicity of ultraviolet radiation-producing lamps, said first header having upstream and downstream ends and opposed sides; and
        a second header for receiving and maintaining in position said multiplicity of ultraviolet radiation-producing lamps, said second header having upstream and downstream ends and opposed sides; and
    fluid flow diverters positioned between said first and second headers and adjacent said opposed sides and adapted to divert substantially all of fluids flowing adjacent said opposed sides toward at least some of said ultraviolet radiation-producing lamps.

19. An immersible and portable module for irradiating fluids comprising:
    a multiplicity of substantially horizontally oriented, substantially vertically spaced-apart ultraviolet radiation-producing lamps;
    a first substantially vertically oriented header for receiving and maintaining in position said multiplicity of ultraviolet radiation-producing lamps;
    a second substantially vertically oriented header for receiving and maintaining in position said multiplicity of ultraviolet radiation-producing lamps; and
    one or more substantially horizontally oriented, elongated fluid displacers positioned approximately at midpoints, in a vertical direction, between adjacent ultraviolet radiation-producing lamps and spaced away from said adjacent lamps in a horizontal direction.

20. The module defined in claim 19 wherein said fluid displacers are connected to said headers.

21. The module defined in claim 19 wherein said fluid displacers are tubularly shaped.

22. The module defined in claim 19 wherein said fluid displacers are made from a material selected from the group consisting of PVC and stainless steel.

23. The module defined in claim 19 further comprising one or more additional fluid displacers spaced away from said adjacent lamps in an opposite horizontal direction.

24. A fluid displacement system for open channel UV disinfection systems utilizing racks of horizontally oriented ultraviolet radiation-producing lamps comprising:

a first support grid positioned in said channel and including upper and lower supports, a pair of opposed legs connected to said supports and one or more support stringers positioned between said legs and connected between said supports;

a second support grid spaced from said first support grid and including upper and lower supports, a pair of opposed legs connected to said supports and one or more support stringers positioned between said legs and connected between said supports; and a multiplicity of substantially horizontally oriented fluid displacers connected between said support stringers and positioned to lie between adjacent ones of said racks.

25. The system defined in claim 24 wherein said fluid displacers are positioned approximately at midpoints, in a vertical direction, between adjacent ultraviolet radiation-producing lamps in said racks and spaced away from said adjacent lamps in a horizontal direction.

26. The system defined in claim 24 further comprising additional fluid displacers connected between said first and second headers at said lower supports and said opposed legs.

27. The system defined in claim 24 wherein said fluid displacers are positioned to displace fluids where the intensity of ultraviolet radiation produced by said ultraviolet radiation-producing lamps is at least about 25 times less than the intensity of ultraviolet radiation produced by said lamps.

* * * * *